(12) United States Patent
Okawa et al.

(10) Patent No.: US 9,903,315 B2
(45) Date of Patent: Feb. 27, 2018

(54) INTERNAL COMBUSTION ENGINE

(71) Applicant: TOYOTA JIDOSHA KABUSHIKI KAISHA, Toyota-shi, Aichi-ken (JP)

(72) Inventors: Makoto Okawa, Toyota (JP); Kazuhito Sakai, Mishima (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 95 days.

(21) Appl. No.: 15/160,517

(22) Filed: May 20, 2016

(65) Prior Publication Data

US 2016/0341154 A1 Nov. 24, 2016

(30) Foreign Application Priority Data

May 22, 2015 (JP) .................................. 2015-104868

(51) Int. Cl.
*F02M 25/06* (2016.01)
*F02D 15/00* (2006.01)
(Continued)

(52) U.S. Cl.
CPC ............ *F02M 25/06* (2013.01); *F01M 13/00* (2013.01); *F01M 13/022* (2013.01); *F02B 5/00* (2013.01); *F02D 13/0234* (2013.01); *F02D 15/00* (2013.01); *F02M 26/22* (2016.02); *F01M 2013/0044* (2013.01); *F01M 2013/027* (2013.01)

(58) Field of Classification Search
CPC ........ F02M 25/06; F02M 26/22; F02D 15/00; F02D 13/0234; F02B 5/00; F01M 13/022; F01M 13/00; F01M 2013/027; F01M 2013/0044

USPC ...................... 60/605.2; 123/572–574, 41.86
See application file for complete search history.

(56) References Cited

U.S. PATENT DOCUMENTS 4,901,703 A * 2/1990 Humphries .......... F01M 13/025
123/559.1
8,122,870 B2 * 2/2012 Konohara ............ F01M 13/022
123/472
(Continued)

FOREIGN PATENT DOCUMENTS

JP 2003-201927 A 7/2003
JP 2011-094557 A 5/2011
(Continued)

*Primary Examiner* — Hoang Nguyen
(74) *Attorney, Agent, or Firm* — Andrews Kurth Kenyon LLP

(57) ABSTRACT

An internal combustion engine is provided. The internal combustion engine includes a supercharger that is arranged in an intake passage; an intercooler that is arranged downstream of the supercharger in a direction of intake air flow, in the intake passage; and a blow-by gas returning apparatus. The blow-by gas returning apparatus includes a bypass passage, an ejector, and a blow-by gas passage. The bypass passage connects a first position that is arranged between the supercharger and the intercooler, and a second position that is arranged downstream of the intercooler of the intake passage together. The ejector is arranged in the bypass passage, and configured to draw in blow-by gas from the crankcase through the blow-by gas passage when air flows through the bypass passage from the first position toward the second position.

8 Claims, 12 Drawing Sheets

(51) Int. Cl.
*F01M 13/00* (2006.01)
*F01M 13/02* (2006.01)
*F02M 26/22* (2016.01)
*F02B 5/00* (2006.01)
*F02D 13/02* (2006.01)

(56) References Cited

U.S. PATENT DOCUMENTS

| | | | |
|---|---|---|---|
| 8,813,731 B2* | 8/2014 | Hattori | F01M 13/022 123/572 |
| 9,556,766 B2* | 1/2017 | Burkhardt | F02D 41/221 |
| 2003/0140909 A1* | 7/2003 | Criddle | F01M 13/022 123/572 |
| 2011/0073082 A1 | 3/2011 | Hattori et al. | |
| 2014/0224232 A1* | 8/2014 | Hotta | F02B 37/16 123/574 |
| 2015/0053188 A1 | 2/2015 | Kuribayashi et al. | |

FOREIGN PATENT DOCUMENTS

| | | |
|---|---|---|
| JP | 2011-236825 A | 11/2011 |
| JP | 2013256939 A | 12/2013 |
| WO | 2013/073010 A1 | 5/2013 |

* cited by examiner

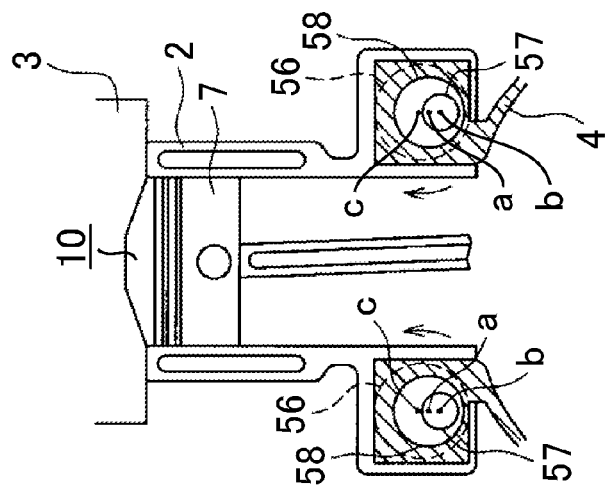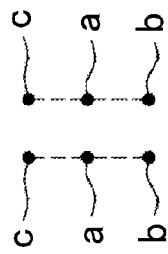
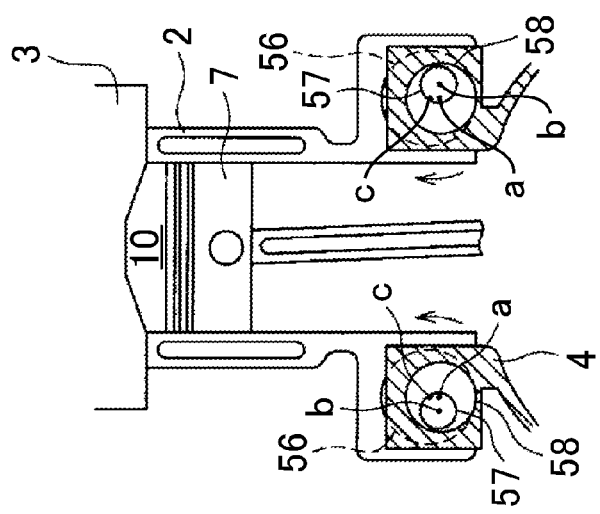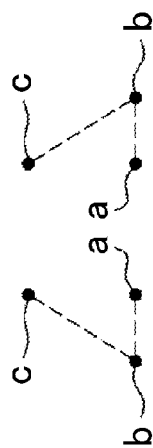
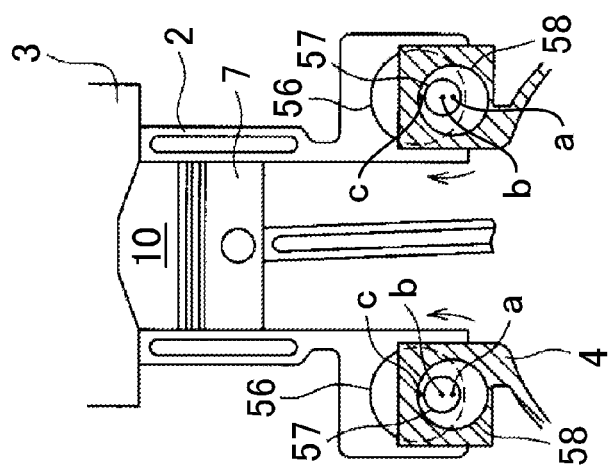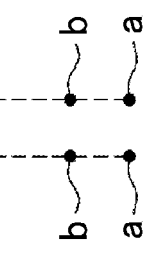

INTERNAL COMBUSTION ENGINE

INCORPORATION BY REFERENCE

The disclosure of Japanese Patent Application No. 2015-104868 filed on May 22, 2015 including the specification, drawings and abstract is incorporated herein by reference in its entirety.

BACKGROUND

1. Field

The disclosure relates to an internal combustion engine.

2. Description of Related Art

Japanese Patent Application Publication No. 2011-94557 (JP 2011-94557 A) describes a blow-by gas returning apparatus provided with an internal combustion engine. One end of this blow-by gas returning apparatus is connected to a crankcase, and the other end of the blow-by gas returning apparatus is connected to an intake passage downstream of a throttle valve. The blow-by gas returning apparatus includes a first blow-by gas passage. The blow-by gas is sucked into the first blow-by gas passage from inside the crankcase by negative pressure generated in the intake passage downstream of the throttle valve. This blow-by gas returning apparatus also includes a bypass passage, an ejector (jet pump), and a second blow-by gas passage. One end of the bypass passage is connected to the intake passage upstream of a supercharger. Also, the other end of the bypass passage is connected to the intake passage downstream of the supercharger. The ejector is provided in the bypass passage. The ejector includes a fluid inlet, a fluid outlet, and a fluid suction port. The ejector is configured such that, when fluid flows from the fluid inlet to the fluid outlet, the ejector draws in different fluid from the fluid suction port. One end of the second blow-by gas passage is connected to the crankcase. The other end of the second blow-by gas passage is connected to the fluid suction port of the ejector.

In JP 2011-94557 A, the fluid inlet of the ejector is connected to the other end side of the bypass passage which is the side downstream of the supercharger in the intake flow direction. Also, the fluid outlet of the ejector is connected to one end side of the bypass passage which is the side upstream of the supercharger in the intake flow direction.

When the pressure downstream of the supercharger becomes higher than the pressure upstream of the supercharger while the supercharger is operating, the pressure on the other end side of the bypass passage will be greater than the pressure on the one end side of the bypass passage. Therefore, air will flow from the other end side of the bypass passage toward the one end side of the bypass passage. That is, even if negative pressure is generated in the intake passage downstream of the throttle valve, if the supercharger is operating, blow-by gas inside the crankcase is able to be drawn into the bypass passage by the ejector. Thus, the crankcase is able to be ventilated. One example of a state in which negative pressure is not generated in the intake passage downstream of the throttle valve is when the throttle valve is fully open.

SUMMARY

However, with the blow-by gas returning apparatus described in JP 2011-94557 A, when in an operating state in which the throttle valve is fully open and the supercharger is not operating, the pressure upstream of the supercharger and the pressure downstream of the supercharger are approximately the same, or the pressure downstream of the supercharger will be lower than the pressure upstream of the supercharger due to pressure loss. Therefore, air will not flow from the other end side of the bypass passage which is the downstream side in the intake flow direction of the supercharger toward the one end side of the bypass passage which is the upstream side in the intake flow direction of the supercharger. That is, air will not flow from the fluid inlet of the ejector toward the fluid outlet of the ejector. Therefore, when in an operating state in which the throttle valve is fully open and the supercharger is not operating, the crankcase is unable to be ventilated, which is problematic. This is because in a case such as that described above, blow-by gas in the crankcase is unable to be drawn into the bypass passage by the ejector.

The disclosure thus provides an internal combustion engine provided with a blow-by gas returning apparatus capable of ventilating the crankcase even in an operating state in which the throttle valve is fully open and the supercharger is not operating.

One aspect of the disclosure relates to an internal combustion engine that includes an engine main body; a supercharger that is arranged in an intake passage of the engine main body; an intercooler that is arranged downstream of the supercharger in a direction of intake air flow, in the intake passage; and a blow-by gas returning apparatus configured to introduce blow-by gas in a crankcase of the engine main body into the intake passage. The blow-by gas returning apparatus includes i) a bypass passage that connects a first position and a second position of the intake passage together, ii) an ejector that is arranged in the bypass passage, and includes a fluid suction port, and is configured to draw in blow-by gas from the fluid suction port when air flows through the bypass passage from the first position toward the second position, and iii) a blow-by gas passage that is configured to connect the crankcase and the fluid suction port together. The first position is between the supercharger and the intercooler, and the second position is downstream of the intercooler.

According to this aspect, air is able to flow into the bypass passage from the first position toward the second position of the intake passage by the pressure difference between both ends of the bypass passage, even in an operating state in which the throttle valve is fully open and the supercharger is not operating, using the fact that the pressure between the supercharger and the intercooler becomes higher than the pressure downstream of the intercooler due to pressure loss of the intercooler. Therefore, even in an operating state in which the throttle valve is fully open and the supercharger is not operating, blow-by gas in the crankcase is able to be drawn into the bypass passage by the ejector, so the crankcase is able to be ventilated.

In some aspects of the disclosure, the internal combustion engine further includes a throttle valve. The throttle valve is arranged downstream of the intercooler in the direction of intake air flow, in the intake passage; and the second position is downstream of the throttle valve.

According to another aspect of the disclosure, an engine system includes an internal combustion engine including: an engine main body; a supercharger that is arranged in an intake passage of the engine main body; an intercooler that is arranged downstream of the supercharger in a direction of intake air flow, in the intake passage; and a blow-by gas returning apparatus configured to introduce blow-by gas in a crankcase of the engine main body into the intake passage. The blow-by gas returning apparatus includes a bypass passage, an ejector, and a blow-by gas passage, and a flowrate regulating valve. The bypass passage connects a first position and a second position of the intake passage together. The ejector is arranged in the bypass passage. The ejector includes a fluid suction port. The ejector is configured to draw in blow-by gas from the fluid suction port when air flows through the bypass passage from the first position toward the second position. The blow-by gas passage is configured to connect the crankcase and the fluid suction port together. The flowrate regulating valve is arranged in the bypass passage, and configured to regulate a flowrate of air that flows into the bypass passage. The first position being between the supercharger and the intercooler, and the second position being downstream of the intercooler. The engine system also includes an electronic control unit configured to control an opening amount of the flowrate regulating valve based on an operating state of the internal combustion engine.

In some aspects of the disclosure, the internal combustion engine further includes a throttle valve. The electronic control unit is configured to control the opening amount of the flowrate regulating valve such that a flowrate of blow-by gas that is drawn in by the ejector comes to match a target flowrate according to the operating state of the internal combustion engine when the internal combustion engine is in a first operating state. The first operating state includes a condition that supercharging by the supercharger is being performed, and a condition that an opening amount of a throttle valve is fully open.

In some aspects of the disclosure, the flowrate of blow-by gas that the ejector draws in from the fluid suction port increases as the flowrate of air that flows into the bypass passage increases. The electronic control unit is configured to increase the opening amount of the flowrate regulating valve the larger the target flowrate is.

In some aspects of the disclosure, the internal combustion engine further includes a throttle valve. The electronic control unit is configured to open the flowrate regulating valve when the internal combustion engine is in a second operating state. The second operating state includes a condition that supercharging by the supercharger is not being performed, and a condition that an opening amount of a throttle valve is fully open.

BRIEF DESCRIPTION OF THE DRAWINGS

Features, advantages, and technical and industrial significance of exemplary embodiments will be described below with reference to the accompanying drawings, in which like numerals denote like elements, and wherein:

FIGS. 3A, 3B, and 3C are views illustrating operation of the variable compression ratio mechanism;

DETAILED DESCRIPTION OF EMBODIMENTS

Figure 1:
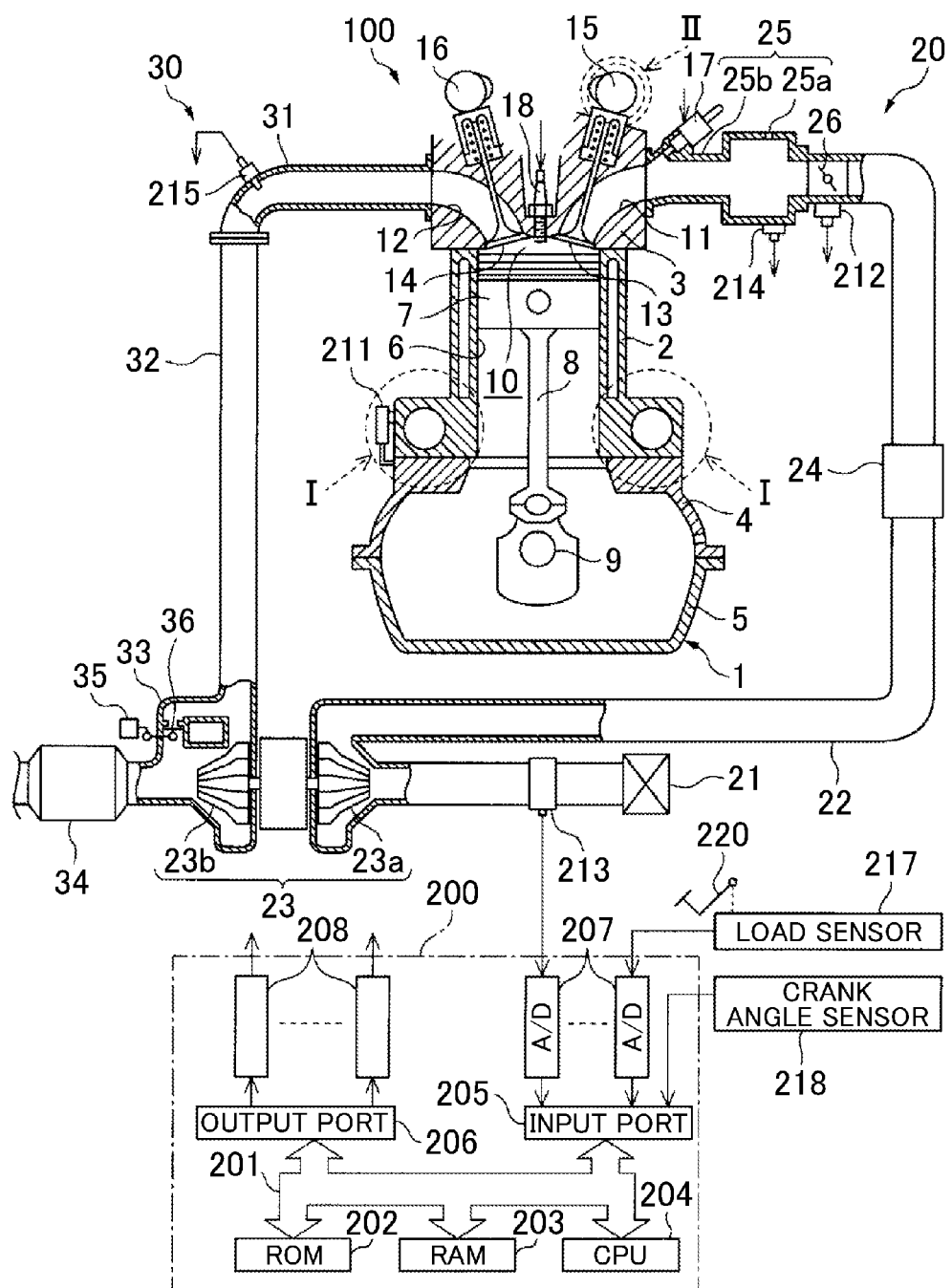
FIG. 1 is a block diagram schematically showing an internal combustion engine according to a first example embodiment.

Hereinafter, example embodiments will be described in detail with reference to the drawings. In the description below, like constituent elements will be denoted by like reference characters.

FIG. 1 is a block diagram schematically showing an internal combustion engine 100 according to a first example embodiment.

As shown in FIG. 1, the internal combustion engine 100 includes an engine main body 1, an intake system 20, an exhaust system 30, and an electronic control unit 200. The engine 100 and the electronic control unit 200 are elements of an engine system.

The engine main body 1 includes a cylinder block 2, a cylinder head 3, a crankcase 4, and an oil pan 5. The cylinder head 3 is mounted to an upper portion of the cylinder block 2. The crankcase 4 is mounted to a lower portion of the cylinder block 2. Also, the oil pan 5 is mounted to a lower portion of the crankcase 4.

A plurality of cylinders 6 are formed in the cylinder block 2. Pistons 7 that receive combustion pressure and consequently move in a reciprocating manner inside the cylinders 6 are housed inside the cylinders 6. The pistons 7 are connected to a crankshaft 9. The crankshaft 9 is rotatably supported inside the crankcase 4 via connecting rods 8. Also, the reciprocating motion of the pistons 7 is converted into rotary motion by the crankshaft 9. A space defined by an inside wall surface of the cylinder head 3, the inside wall surfaces of the cylinders 6, and the piston crown surfaces are combustion chambers 10. Hereinafter, portions that are provided in multiples, such as the cylinders 6, the pistons 7, and the combustion chambers 10, may be referred to in the singular as appropriate to simplify the description and facilitate understanding.

An intake port 11 an exhaust port 12 are formed in the cylinder head 3. The intake port 11 opens to one side surface of the cylinder head 3. Also, the intake port 11 opens to the combustion chamber 10. The exhaust port 12 opens to the other side surface of the cylinder head 3. Also, the exhaust port 12 opens to the combustion chamber 10.

An intake valve 13, an exhaust valve 14, an intake camshaft 15, and an exhaust camshaft 16 are all mounted to the cylinder head 3. The intake valve 13 is configured to open and close a connecting portion between the combustion chamber 10 and the intake port 11. The exhaust valve 14 is configured to open and close a connecting portion between the combustion chamber 10 and the exhaust port 12. The intake valve 13 is driven open and closed by the intake camshaft 15. The exhaust valve 14 is driven open and closed by the exhaust camshaft 16. A variable valve timing mechanism II capable of changing the valve closing timing of the intake valve 13 to a suitable timing is provided on one end portion of the intake camshaft 15. This variable valve timing mechanism II will be described in detail later with reference to FIGS. 4 and 5.

Furthermore, a spark plug 18 is mounted to the cylinder head 3. A mixture of air and fuel injected from a fuel injection valve 17 is ignited in the combustion chamber 10 by the spark plug 18. Also, the fuel injection valve 17 is mounted in each intake branch pipe 25*b* of an intake manifold 25, as will be described later. The fuel injection valve 17 may also be mounted to the cylinder head 3 so as to inject fuel into the combustion chamber 10.

A variable compression ratio mechanism I is provided in a connecting portion between the cylinder block 2 and the crankcase 4. The variable compression ratio mechanism I according to this example embodiment is configured to change the volume of the combustion chamber 10 when the piston 7 is positioned at compression TDC (Top Dead Center), by changing the relative position of the cylinder block 2 and the crankcase 4 in a cylinder axial direction. A relative position sensor 211 is mounted to the connecting portion between the cylinder block 2 and the crankcase 4. This relative position sensor 211 detects the relative positional relationship between the cylinder block 2 and the crankcase 4. A signal indicative of a change in the distance between the cylinder block 2 and the crankcase 4 is output from this relative position sensor 211. The variable compression ratio mechanism I will be described in detail later with reference to FIGS. 2 and 3.

The intake system 20 is a system for introducing air into the cylinders 6 via the intake port 11. The intake system 20 includes an air cleaner 21, an intake pipe 22, a compressor 23*a* of a turbocharger 23, an intercooler 24, an intake manifold 25, an electronically controlled throttle valve 26, a throttle sensor 212, an airflow meter 213, and a boost pressure sensor 214.

The air cleaner 21 removes foreign matter such as sand in the air.

One end of the intake pipe 22 is connected to the air cleaner 21, and the other end of the intake pipe 22 is connected to a surge tank 25*a* of the intake manifold 25.

The turbocharger 23 is one type of supercharger. The turbocharger 23 forcibly compresses air using the energy of the exhaust. The turbocharger 23 then supplies this compressed air to the cylinders 6. As a result, the charging efficiency increases, so the engine output increases. The compressor 23*a* is a component that forms part of the turbocharger 23, and is provided in the intake pipe 22. The compressor 23*a* compresses the air by being rotated by a turbine 23*b* of the turbocharger 23, described later, that is provided on the same axis as the compressor 23*a*. A supercharger that is mechanically driven using the rotational force of the crankshaft 9 may also be used instead of the turbocharger 23.

The intercooler 24 is provided in the intake pipe 22 downstream of the compressor 23*a*. The intercooler 24 cools the air that has been compressed by the compressor 23*a* and has increased in temperature as a result. Cooling the air increases the volume density of the air thus further increasing charging efficiency. Also, cooling the air suppresses an increase in temperature of the air-fuel mixture caused by high-temperature intake air being drawn into the cylinders 6, which enables knocking and the like to be suppressed.

The intake manifold 25 includes the surge tank 25*a* and the plurality of intake branch pipes 25*b*. The intake branch pipes 25*b* branch off from the surge tank 25*a* and are connected to the openings of the intake ports 11 formed in the cylinder head side surface. Air lead to the surge tank 25*a* is distributed evenly in the cylinders 6 via the intake branch pipes 25*b*. In this way, the intake pipe 22, the intake manifold 25, and the intake port 11 together form an intake passage for leading air into the cylinders 6.

The throttle valve 26 is provided inside the intake pipe 22 between the intercooler 24 and the surge tank 25*a*. The throttle valve 26 is driven by a throttle actuator, not shown. The throttle valve 26 changes the passage sectional area of the intake pipe 22 continuously or in a stepped manner. The flowrate of air drawn into the cylinders 6 is able to be regulated by adjusting the opening amount of the throttle valve, hereinafter referred to as the "throttle opening amount", with the throttle actuator. The throttle opening amount is detected by the throttle sensor 212.

The airflow meter 213 is provided inside the intake pipe 22 upstream of the compressor 23*a*. The airflow meter 213 detects the flowrate of air flowing through the intake pipe 22, hereinafter referred to as the "intake air amount".

The boost pressure sensor 214 is provided in the surge tank 25*a*. The boost pressure sensor 214 detects the pressure inside the surge tank 25*a*.

The exhaust system 30 is a system for purifying combustion gas (exhaust) generated in the combustion chamber 10 and discharging it outside. The exhaust system 30 includes an exhaust manifold 31, an exhaust pipe 32, a turbine 23*b* of the turbocharger 23, an exhaust bypass passage 33, an exhaust after-treatment system 34, and an air-fuel ratio sensor 215.

The exhaust manifold 31 includes a plurality of exhaust branch pipes and a collecting pipe. The plurality of exhaust branch pipes are connected to openings of the exhaust ports 12 formed in the cylinder head side surface. The collecting pipe is a pipe where the plurality of exhaust branch pipes converge into one.

One end of the exhaust pipe 32 is connected to the collecting pipe of the exhaust manifold 31. The other end of the exhaust pipe 32 is an open end. Exhaust gas discharged from the cylinders 6 to the exhaust manifold 31 via the exhaust ports 12 flows through the exhaust pipe 32 and is discharged outside.

The turbine 23*b* is a component that forms part of the turbocharger 23, and is provided in the exhaust pipe 32. The turbine 23*b* is rotated by the energy of the exhaust, and drives the compressor 23*a* that is provided on the same axis as the turbine 23*b*.

The exhaust bypass passage 33 is a passage that is connected to the exhaust pipe 32 upstream of the turbine 23*b* and the exhaust pipe 32 downstream of the turbine 23*b* so as to bypass the turbine 23*b*.

A waste gate valve 36 is provided in the exhaust bypass passage 33. This waste gate valve 36 is driven by a waste gate actuator 35. The waste gate valve 36 is able to adjust the passage sectional area of the exhaust bypass passage 33 continuously or in a stepped manner. When the waste gate valve 36 opens, some or all of the exhaust gas flowing through the exhaust pipe 32 flows into exhaust bypass passage 33. Then this exhaust gas bypasses the turbine 23*b* and is discharged outside. Therefore, the flowrate of exhaust gas that flows into the turbine 23*b* is able to be regulated by adjusting the opening amount of the waste gate valve 36. Furthermore, the rotation speed of the turbine 23*b* is also able to be controlled. That is, the pressure (boost pressure) of air compressed by the compressor 23*a* is able to be controlled by adjusting the opening amount of the waste gate valve 36.

The exhaust after-treatment system 34 is provided downstream of the turbine 23*b*, in the exhaust pipe 32. The exhaust after-treatment system 34 is a system for purifying the exhaust gas and then discharging the purified exhaust gas outside. The exhaust after-treatment system is a carrier that carries a variety of kinds of catalysts (e.g., a three way catalyst) that purifies toxic substances.

The air-fuel ratio sensor 215 is provided in the collecting pipe of the exhaust manifold 31 and detects the air-fuel ratio of the exhaust gas.

The electronic control unit 200 is formed by a digital computer. Also, the electronic control unit 200 includes ROM (Read-Only Memory) 202, RAM (Random Access Memory) 203, a CPU (microprocessor) 204, an input port 205, and an output port 206, which are all connected together by a bidirectional bus 201.

Signals output from the relative position sensor 211, the throttle sensor 212, the airflow meter 213, the boost pressure sensor 214, and the air-fuel ratio sensor 215 and the like are input to the input port 205 via corresponding AD converters 207. In addition, output voltage of a load sensor 217 is also input via a corresponding AD converter 207. The load sensor 217 is configured to generate output voltage proportional to a depression amount of an accelerator pedal 220 (hereinafter referred to as "accelerator depression amount"), and output this output voltage. Also, an output signal from a crank angle sensor 218 is input to the input port 205 in order to calculate the engine speed and the like. The crank angle sensor 218 generates an output pulse each time the crankshaft 9 of the engine main body 1 rotates 15°, for example, and outputs a signal. In this way, output signals from a variety of sensors necessary to control the internal combustion engine 100 are input to the input port 205.

Various control components are electrically connected to the output port 206. These control components include the fuel injection valve 17, the spark plug 18, the waste gate actuator 35, the variable compression ratio mechanism I, and the variable valve timing mechanism II and the like. These control components are connected to the output port 206 via corresponding driving circuits 208.

The electronic control unit 200 outputs control signals for controlling the various control components from the output port 206. The control signals are output based on the output signals from various sensors that are input to the input port 205. In this way, the electronic control unit 200 controls the internal combustion engine 100.

Figure 2:
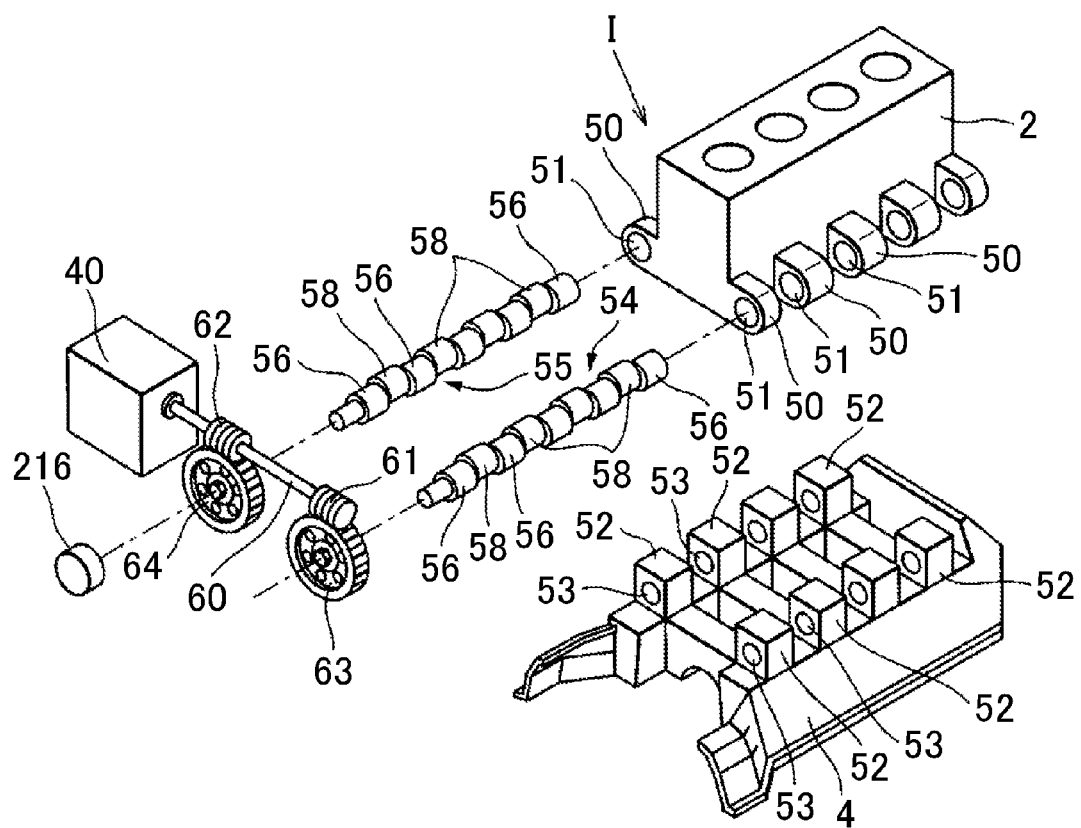
FIG. 2 is an exploded perspective view of a variable compression ratio mechanism.

FIG. 2 is an exploded perspective view of the variable compression ratio mechanism I according to this example embodiment.

As shown in FIG. 2, a plurality of protruding portions 50 are formed spaced apart from each other below both side walls in the short (transverse) direction of the cylinder block 2. This plurality of protruding portions 50 is provided in the long (longitudinal) direction of the cylinder block 2. The protruding portions 50 are one example of the first protruding portion. A cam insertion hole 51 having a circular cross-section is formed in each protruding portion 50. The cam insertion hole 51 is one example of a first cam insertion hole. Meanwhile, a plurality of protruding portions 52 are formed spaced apart from each other and between the corresponding protruding portions 50, on an upper wall surface of the crankcase 4. A cam insertion hole 53 having a circular cross-section is formed in each of these protruding portions 52. The protruding portions 52 are one example of the second protruding portion, and the cam insertion hole 53 is one example of the second cam insertion hole.

Also, the variable compression ratio mechanism I includes a pair of camshafts 54 and 55. Circular cams 58 are fixed on each of the camshafts 54 and 55. The circular cams 58 are configured to be rotatably inserted into the cam insertion holes 53 at predetermined intervals. These circular cams 58 are coaxial with the rotational axes of the camshafts 54 and 55. Meanwhile, eccentric shafts 57 (see FIGS. 3A, 3B, and 3C) extend on both sides of the circular cams 58, in the axial direction of the camshafts 54 and 55. These eccentric shafts 57 are arranged eccentric with respect to the rotational axes of the camshafts 54 and 55. Also, other circular cams 56 are eccentrically and rotatably mounted on the eccentric shafts 57. As shown in FIG. 2, these circular cams 56 are arranged on both sides of the circular cams 58 in the axial direction of the camshafts 54 and 55, and these circular cams 56 are rotatably inserted into the corresponding cam insertion holes 51.

A pair of worms 61 and 62 and worm wheels 63 and 64 are mounted to one end portion of the camshafts 54 and 55. The pair of worms 61 and 62 are provided on a control shaft 60. The worm wheels 63 and 64 are in mesh with the worms 61 and 62, respectively. Here, the worms 61 and 62 are one example of the first worm and the second worm, respectively. Also, the worm wheels 63 and 64 are one example of the first worm wheel and the second worm wheel, respectively. The helical directions (the spiral directions) of the pair of worms 61 and 62 are reversed. Because the helical directions are opposite, the camshafts 54 and 55 rotate in opposite directions. The control shaft 60 is rotated by a drive motor 40. That is, when the drive motor 40 is driven, the camshafts 54 and 55 are rotated in opposite directions. By rotating the camshafts 54 and 55 in opposite directions, the volume of the combustion chamber 10 when the piston 7 is positioned at compression TDC (top dead center) is able to be changed, as shown in FIGS. 3A, 3B, and 3C. A cam rotation angle sensor 216 is mounted to the camshaft 55. The cam rotation angle sensor 216 outputs a signal indicative of a rotation angle of the camshaft 55. The signal output from the cam rotation angle sensor 216 is input to the electronic control unit 200 via the corresponding AD converter 207. Hereinafter, operation of the variable compression ratio mechanism I will be described with reference to FIGS. 3A, 3B, and 3C.

FIGS. 3A, 3B, and 3C are views illustrating the operation of the variable compression ratio mechanism I.

FIG. 3A is a view of a state in which the volume of the combustion chamber 10 when the piston 7 is positioned at compression TDC is increased by the variable compression ratio mechanism I. FIG. 3B is a view of a state in which the volume of the combustion chamber 10 when the piston 7 is positioned at compression TDC is between maximum and minimum, by the variable compression ratio mechanism I. FIG. 3C is a view of a state in which the volume of the combustion chamber 10 when the piston 7 is positioned at compression TDC is the minimum, by the variable compression ratio mechanism I.

The circular cams 58 are fixed on to the camshafts 54 and 55. From a state such as that shown in FIG. 3A, the circular cams 58 are rotated in the directions shown by the arrows, i.e., in opposite directions. As a result, the eccentric shafts 57 move in directions away from each other. Therefore, the circular cams 56 rotate in opposite directions from the circular cams 58 inside the cam insertion holes 51. Also, the positions of the eccentric shafts 57 change from high positions to intermediate positions, as shown in FIG. 3B. Then when the circular cams 58 are rotated further in the directions indicated by the arrows, the eccentric shafts 57 come to be in the lowest positions, as shown in FIG. 3C.

The positional relationships between the centers a of the circular cams 58, the centers b of the eccentric shafts 57, and the centers c of the circular cams 56 in each of these states are indicated in FIGS. 3A, 3B, and 3C.

As is evident when comparing FIGS. 3A, 3B, and 3C, the relative position of the crankcase 4 and the cylinder block 2 is determined by the distance between the centers a of the circular cams 58 and the centers c of the circular cams 56. As the distance between the centers a of the circular cams 58 and the centers c of the circular cams 56 increases, the cylinder block 2 moves farther in the direction in which the distance between the cylinder block 2 and the crankcase 4 increases. That is, the variable compression ratio mechanism I changes the relative position between the crankcase 4 and the cylinder block 2 by a crank mechanism that uses the rotating cams. As the cylinder block 2 moves farther away from the crankcase 4, the volume of the combustion chamber 10 when the piston 7 is positioned at compression TDC increases. In this way, the volume of the combustion chamber 10 when the piston 7 is at compression TDC is able to be changed by rotating the camshafts 54 and 55.

Figure 4:
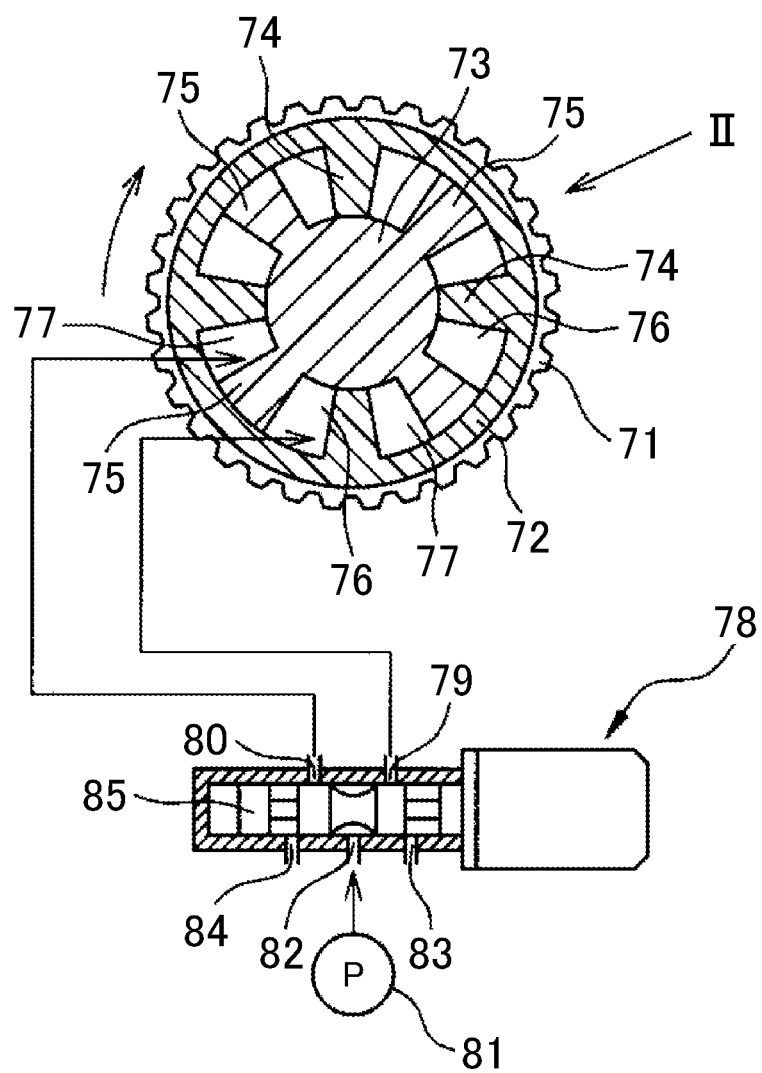
FIG. 4 is a block diagram schematically showing a variable valve timing mechanism.

FIG. 4 is a block diagram schematically showing the variable valve timing mechanism II according to this example embodiment, which is provided on one end portion of the intake camshaft 15.

As shown in FIG. 4, the variable valve timing mechanism II includes a timing pulley 71, a cylindrical housing 72, a rotating shaft 73, a plurality of dividing walls 74, and vanes 75. Also, an advancing hydraulic chamber 76 and a retarding hydraulic chamber 77 are formed on both sides of each of the vanes 75, in the circumferential direction of the rotating shaft 73. The timing pulley 71 is rotated by the crankshaft 9 in the direction indicated by the arrow via a timing belt. The cylindrical housing 72 rotates together with the timing pulley 71. The rotating shaft 73 rotates together with the intake camshaft 15. Also, the rotating shaft 73 is able to rotate relative to the cylindrical housing 72. The plurality of dividing walls 74 extend from an inner peripheral surface of the cylindrical housing 72 to an outer peripheral surface of the rotating shaft 73. The vanes 75 extend from the outer peripheral surface of the rotating shaft 73 to the inner peripheral surface of the cylindrical housing 72, between the dividing walls 74.

The supply of hydraulic fluid to the hydraulic chambers 76 and 77 is controlled by a hydraulic fluid supply control valve 78. This hydraulic fluid supply control valve 78 includes hydraulic ports 79 and 80, a supply port 82, a pair of drain ports 83 and 84, and a spool valve 85. The hydraulic ports 79 and 80 are connected to the hydraulic chambers 76 and 77, respectively. Hydraulic fluid discharged from a hydraulic pump 81 is supplied from the supply port 82. The spool valve 85 performs control to cut off communication between the ports 79, 80, 82, 83, and 84.

When the phase of the cam of the 15 is to be advanced, the spool valve 85 is moved to the right in FIG. 4. Then the hydraulic fluid supplied from the supply port 82 is supplied to the advancing hydraulic chamber 76 via the hydraulic port 79. Also, hydraulic fluid in the retarding hydraulic chamber 77 is discharged from the drain port 84. At this time, the rotating shaft 73 is moved in the direction of the arrow relative to the cylindrical housing 72.

In contrast, when the phase of the cam of the intake camshaft 15 is to be retarded, the spool valve 85 is moved to the left in FIG. 4. Then the hydraulic fluid supplied from the supply port 82 is supplied to the retarding hydraulic chamber 77 via the hydraulic port 80. Also, hydraulic fluid in the advancing hydraulic chamber 76 is discharged from the drain port 83. At this time, the rotating shaft 73 is moved in the opposite direction from the arrow relative to the cylindrical housing 72.

When the spool valve 85 returns to the neutral position shown in FIG. 4 when the rotating shaft 73 rotates relative to the cylindrical housing 72, relative rotation of the rotating shaft 73 stops. That is, the rotating shaft 73 is kept in the relative rotational position at that time. In this way, the phase of the cam of the intake camshaft 15 is able to be advanced or retarded by a desired amount, by the variable valve timing mechanism II.

Figure 5:
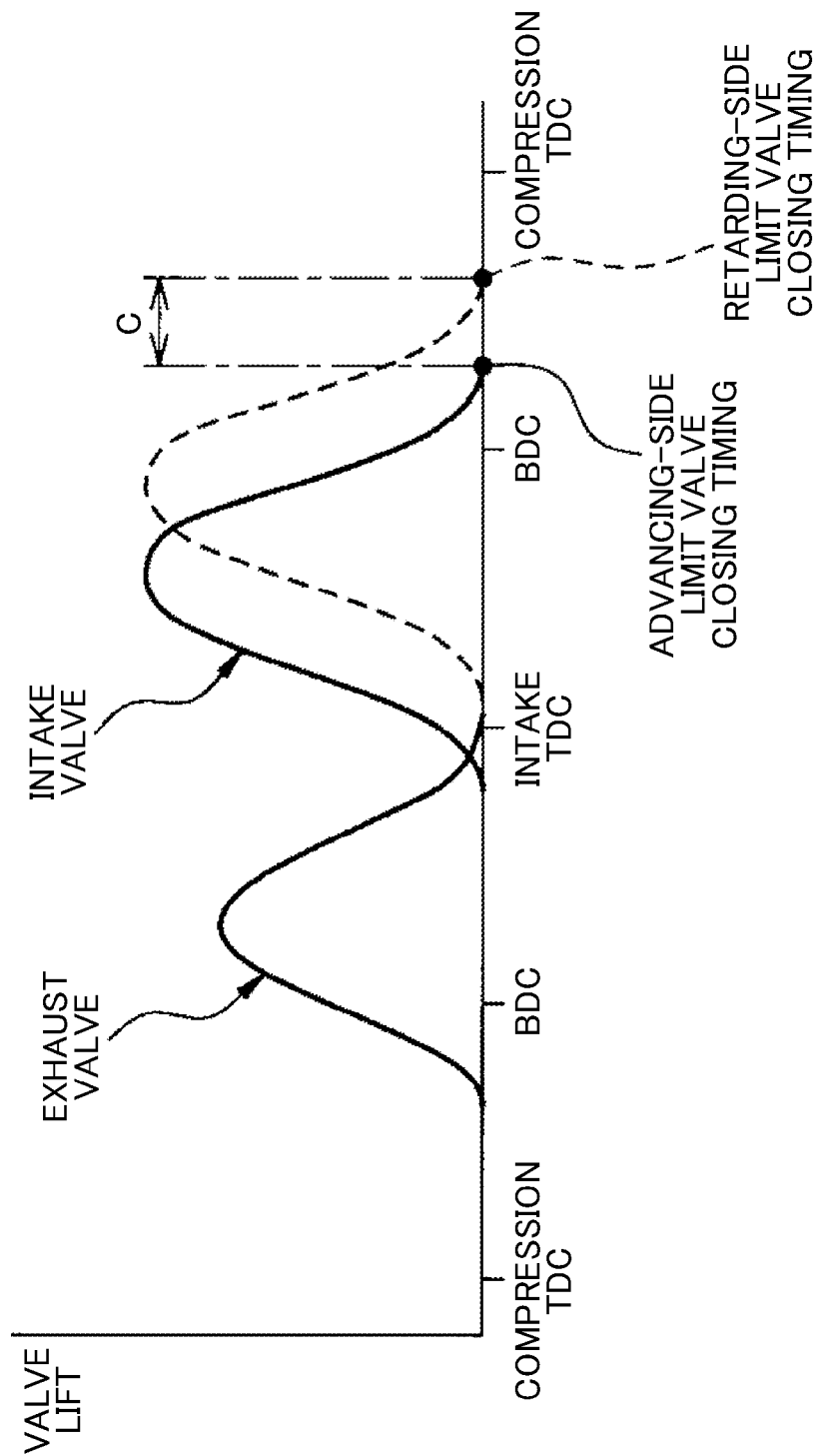
FIG. 5 is a view illustrating operation of the variable valve timing mechanism.

FIG. 5 is a view illustrating operation of the variable valve timing mechanism II.

The solid line in FIG. 5 represents when the phase of the cam of the intake camshaft 15 is most advanced by the variable valve timing mechanism II. The broken line in FIG. 5 represents when the phase of the cam of the intake camshaft 15 is most retarded. The valve open period of the intake valve 13 is able to be set appropriately between the range indicated by the solid line and the range indicated by the broken line in FIG. 5. Also, the valve closed period of the intake valve 13 is also able to be set to an appropriate crank angle within the range indicated by arrow C in FIG. 5.

The valve closing timing of the intake valve 13 is able to be changed by the variable valve timing mechanism II to an appropriate timing from a valve closing timing when the phase of the cam of the intake camshaft 15 is most advanced to a valve closing timing when the phase of the cam of the intake camshaft 15 is most retarded. Hereinafter, the valve closing timing when the phase of the cam of the intake camshaft 15 is most advanced will be referred to as the "advancing-side limit valve closing timing". Also, the valve closing timing when the phase of the cam of the intake camshaft 15 is most retarded will be referred to as the "retarding-side limit valve closing timing".

The variable valve timing mechanism II shown in FIGS. 1 and 4 shows one example. For example, a variable valve timing mechanism in which the valve opening timing of the intake valve 13 is kept constant and only the valve closing timing of the intake valve 13 is changed may also be used. Also, a variable valve timing mechanism of any of a variety of modes may be used.

Next, the meanings of the terms "mechanical compression ratio", "actual compression ratio", and "expansion ratio" used in this specification will be described with reference to FIGS. 6A, 6B, and 6C. To describe these terms, the engine main body 1 having a combustion chamber volume of 50 ml and a stroke volume of the piston 7 is 500 ml is shown FIGS. 6A, 6B, and 6C. The combustion chamber volume in FIGS. 6A to 6C shows the volume of the combustion chamber 10 when the piston 7 is positioned at compression TDC.

Figure 6A:
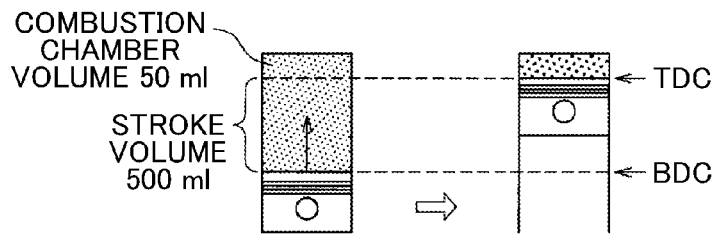
FIGS. 6A, 6B, and 6C are views illustrating a mechanical compression ratio, an actual compression ratio, and an expansion ratio.

FIG. 6A is a view illustrating the mechanical compression ratio.

The mechanical compression ratio is a value that is mechanically determined from only the compression chamber volume and the stroke volume of the piston 7 during a compression stroke, and is expressed by (compression chamber volume+stroke volume)/combustion chamber volume. In the example shown in FIG. 6A, the mechanical compression ratio is (50 ml+500 ml)/50 ml=11.

Figure 6B:
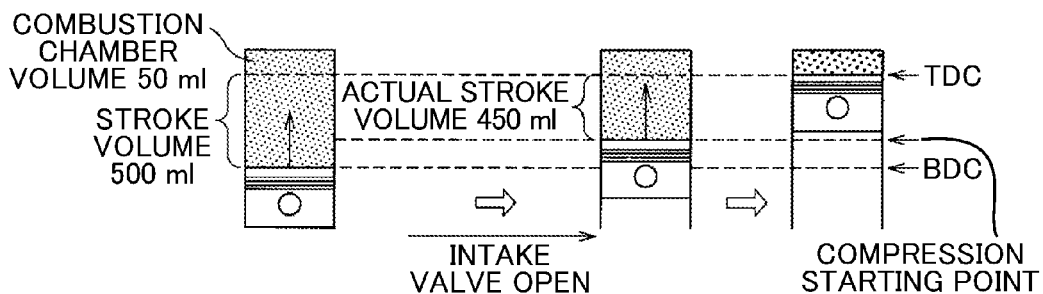
Figure 6C:
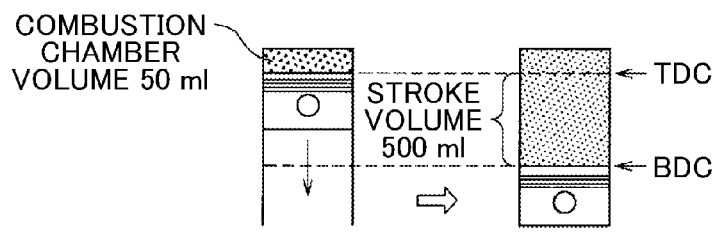

FIG. 6B is a view illustrating the actual compression ratio.

The actual compression ratio is a value determined from the combustion chamber volume and the actual piston stroke volume from when a compression operation actually starts until the piston 7 reaches TDC, and is expressed by (compression chamber volume+actual stroke volume)/combustion chamber volume. That is, even if the piston 7 starts to rise during a compression stroke as shown in FIG. 6B, the compression operation is not performed while the intake valve 13 is open, so the actual compression operation starts from the time that the intake valve 13 closes. Therefore, the actual compression ratio is expressed as shown below using the actual stroke volume. In the example shown in FIG. 6B, the actual compression ratio is (50 ml+450 ml)/50 ml=10.

FIG. 6C is a view illustrating the expansion ratio.

The expansion ratio is a value determined from the compression chamber volume and the stroke volume of the piston 7 during the expansion stroke, and is expressed by (compression chamber volume+stroke volume)/combustion chamber volume. In the example shown in FIG. 6C, the expansion ratio is (50 ml+500 ml)/50 ml=11.

Figure 7:
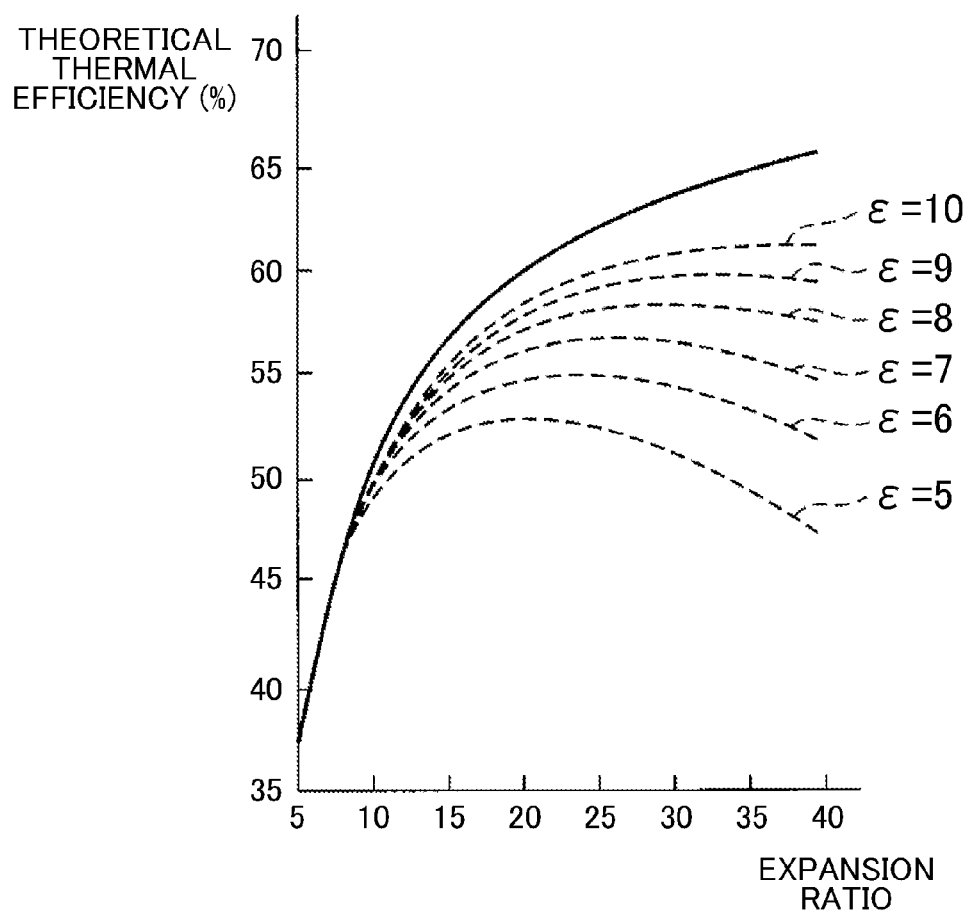
FIG. 7 is a view of the relationship between theoretical thermal efficiency and expansion ratio.

FIG. 7 is a view of the relationship between theoretical thermal efficiency and the expansion ratio.

The solid line in FIG. 7 shows a change in the theoretical thermal efficiency when the actual compression ratio and the expansion ratio are substantially equal, i.e., in a normal cycle. In this case, it is evident that the theoretical thermal efficiency increases as the expansion ratio increases, i.e., as the actual compression ratio increases. Therefore, to increase the theoretical thermal efficiency in a normal cycle, the actual compression ratio need only be increased. However, the actual compression ratio is only able to be increased to a certain point due to the restriction of the occurrence of knocking when the engine is operating under a high load. Therefore, the theoretical thermal efficiency is unable to be sufficiently increased in a normal cycle.

Under such circumstances, increasing the theoretical thermal efficiency while strictly separating mechanical compression ratio from the actual compression ratio has been examined. As a result, it was found that the expansion ratio controls the theoretical thermal efficiency. It was also found that the actual compression ratio has almost no effect on the theoretical thermal efficiency. That is, it is evident that when the actual compression ratio is increased, the combustion force increases but a large amount of energy is required for compression. As a result, even if the actual compression ratio is increased, the theoretical thermal efficiency does not increase much at all.

In contrast, when the expansion ratio is increased, the period during which pushdown force is applied to the piston 7 during the expansion stroke becomes longer, so the period during which the piston 7 applies rotation force to the crankshaft 9 becomes longer. Therefore, the theoretical thermal efficiency becomes higher the larger the expansion ratio is. The broken line $\epsilon=10$ in FIG. 7 shows the theoretical thermal efficiency when the expansion ratio has been increased while the actual compression ratio is fixed at 10. In this way, it is evident that there is not a large difference between the increase amount of the theoretical thermal efficiency when the expansion ratio is increased while the actual compression ratio c is maintained at a low value, and the increase amount of the theoretical thermal efficiency when the actual compression ratio shown by the solid line in FIG. 7 is increased together with the expansion ratio.

When the actual compression ratio is maintained at a low value in this way, knocking will not occur, so when the expansion ratio is increased while the actual compression ratio is maintained at a low value, the theoretical thermal efficiency is able to be significantly increased while avoiding knocking. Also, typically, the thermal efficiency tends to deteriorate when the engine load of the internal combustion engine is low, so in order to increase the thermal efficiency when the engine is operating and increase fuel efficiency, it is effective to increase the thermal efficiency when the engine load is low.

Hereinafter, the basic control of the variable compression ratio mechanism I and the variable valve timing mechanism II according to this example embodiment will be described with reference to FIG. 8.

Figure 8:
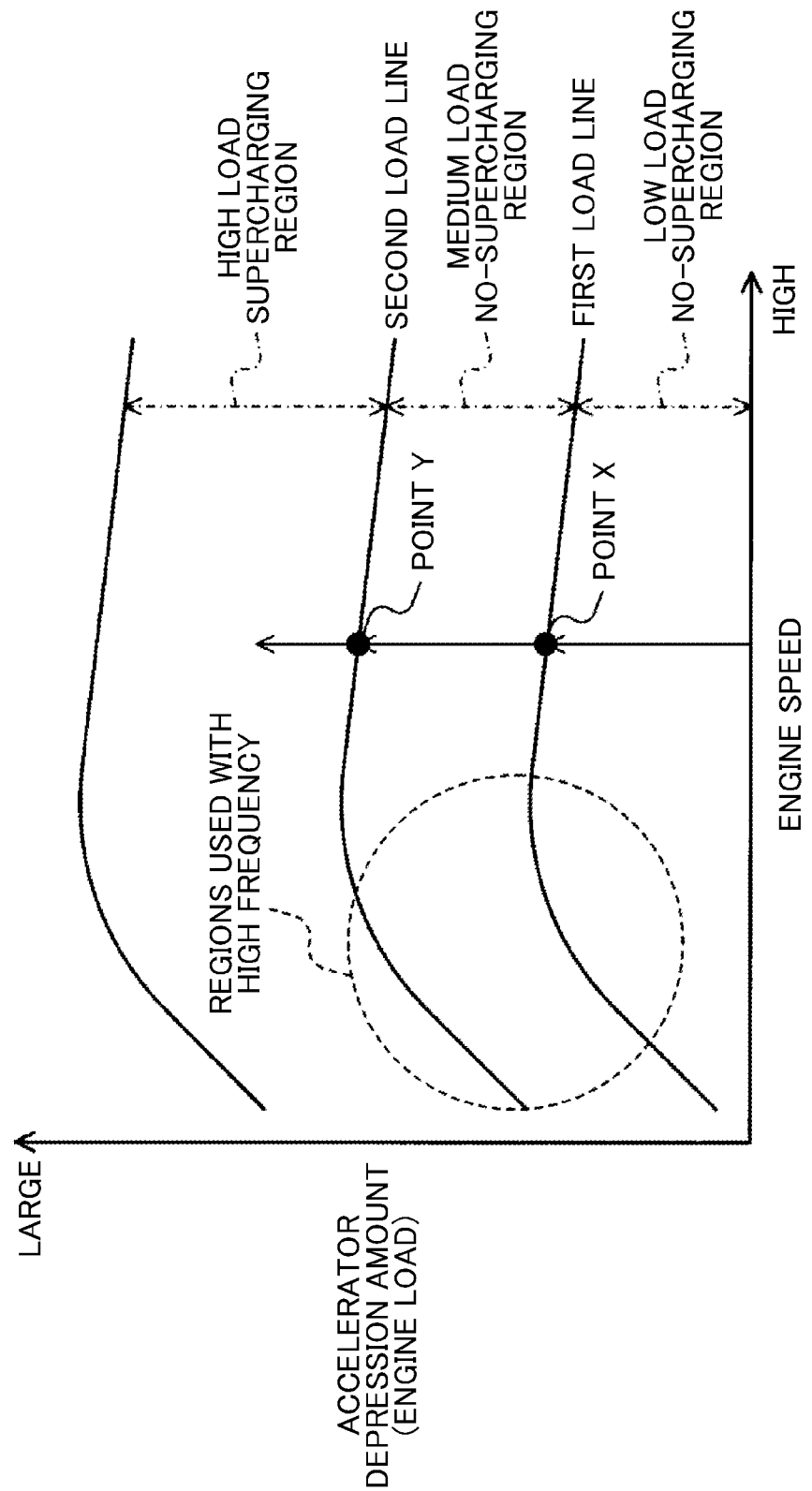
FIG. 8 is a map illustrating the operating region of an engine main body.

FIG. 8 is a map of the operating region of the engine main body 1. As shown in FIG. 8, in this example embodiment, the operating region of the engine main body 1 is divided into three regions by a first load line and a second load line. In the description below, for the sake of convenience, the region below the first load line will be referred to as the "low load no-supercharging region". The region below the second load line other than the low load no-supercharging region will be referred to as the "medium load no-supercharging region. The engine load region above the second load line will be referred to as the "high load supercharging region".

When the engine operating point determined based on the engine speed and the accelerator depression amount (i.e., the engine load) is in the low load no-supercharging region, the electronic control unit 200 fixes the valve closing timing of the intake valve 13 at the regarding-side limit valve closing timing that most retards the valve closing timing of the intake valve 13 from intake BDC (bottom dead center) without performing supercharging with the turbocharger 23, controls the intake air amount with the throttle valve 26, and fixes the mechanical compression ratio at an upper limit mechanical compression ratio. The upper limit mechanical compression ratio is a mechanical compression ratio when the compression chamber volume is the minimum (the state shown in FIG. 3C).

In this way, when the operating point is in the low load no-supercharging region, the electronic control unit 200 maintains the expansion ratio at the maximum expansion ratio by fixing the mechanical compression ratio at the upper limit mechanical compression ratio, and maintains the actual compression ratio at a predetermined value (11 in this example embodiment) at which knocking and pre-ignition will not occur by fixing the valve closing timing of the intake valve 13 at the retarding-side limit valve closing timing.

When applied to the engine main body 1 shown in FIGS. 6A, 6B, and 6C, the actual piston stroke volume changes from 500 ml to 200 ml, for example, as a result of fixing the valve closing timing of the intake valve 13 to the retarding-side limit valve closing timing, and the combustion chamber volume changes from 50 ml to 20 ml, for example, as a result of fixing the mechanical compression ratio to the upper limit mechanical compression ratio. Therefore, in the engine main body 1 shown in FIGS. 6A, 6B, and 6C, when the engine operating point is in the low load no-supercharging region, the actual compression ratio is (20 ml+200 ml)/20 ml=11, and the expansion ratio is (20 ml+500 ml)/20 ml=26.

As a result, in the low load no-supercharging region, the expansion ratio is able to be maintained at the maximum expansion ratio while maintaining the actual compression ratio at a value at which knocking will not occur, so the theoretical thermal efficiency is able to be significantly increased while suppressing the occurrence of knocking.

Also, when the engine operating point is in the low load no-supercharging region, the electronic control unit 200 controls the throttle valve 26 such that the intake air amount reaches a target intake air amount according to the engine load. More specifically, when the engine speed is constant, the throttle opening amount is increased as the engine load increases such that the throttle valve 26 is fully open when the engine load is at point X on the first load line as shown in FIG. 8. Therefore, when the engine load is higher than the first load line, the intake air amount is no longer able to be controlled by the throttle valve 26. Thus, when the engine load is higher than the first load line, the intake air amount is increased by advancing the valve closing timing of the intake valve 13 to the intake BDC side from the retarding-side limit valve closing timing.

That is, when the engine operating point is in the medium load no-supercharging region, the electronic control unit 200 fixes the throttle valve 26 at fully open without performing supercharging with the turbocharger 23, controls the intake air amount with the variable valve timing mechanism II, and reduces the mechanical compression ratio from the upper limit mechanical compression ratio such that the actual compression ratio is maintained at a predetermined value.

More specifically, when the engine speed is constant, the intake system 20 increases the intake air amount as the engine load increases, such that the valve closing timing of the intake valve 13 becomes the advancing-side limit valve closing timing when the engine load is at point Y on the second load line as shown in FIG. 8. Then, the electronic control unit 200 reduces the mechanical compression ratio from the upper limit mechanical compression ratio as the engine load increases, such that the actual compression ratio is maintained at the predetermined value.

In the engine main body 1 shown in FIGS. 6A, 6B, and 6C, when the actual piston stroke volume is changed from 500 ml to 400 ml, for example, by advancing the valve closing timing of the intake valve 13 to the intake BDC side from the retarding-side limit valve closing timing, electronic control unit 200 reduces the combustion chamber volume to 40 ml in order to keep the actual compression ratio constant at 11.

In this way, in the medium load no-supercharging region, the valve closing timing of the intake valve 13 is controlled to a valve closing timing between the retarding-side limit valve closing timing and the advancing-side limit valve closing timing, and the mechanical compression ratio is made smaller than the upper limit mechanical compression ratio according to the controlled valve closing timing in order to keep the actual compression ratio at the predetermined value. Therefore, in the medium load no-supercharging region, the engine main body 1 is able to be operated in a state in which the expansion ratio is continuously maintained at a value higher than the actual compression ratio, even though the expansion ratio is smaller than the maximum expansion ratio. Accordingly, the theoretical thermal efficiency is able to be increased while suppressing the occurrence of knocking in the medium load no-supercharging range as well. Also, in the medium load no-supercharging range, the throttle valve 26 is fixed at fully open, so pumping loss is able to be reduced to substantially zero.

Also, when the engine load is higher than the second load line, the intake air amount is no longer able to be controlled by either the throttle valve 26 or the variable valve timing mechanism II. Therefore, when the engine load becomes higher than the second load line, the intake air amount is increased by performing supercharging with the turbocharger 23.

That is, when the engine operating point is in the high load supercharging region, the electronic control unit 200 fixes the valve closing timing of the intake valve 13 at the advancing-side limit valve closing timing while fixing the throttle opening amount at fully open, controls the boost pressure (i.e., the opening amount of the waste gate valve 36) by the turbocharger 23 such that the intake air amount reaches the target intake air amount, and fixes the mechanical compression ratio at a lower limit mechanical compression ratio. The lower limit mechanical compression ratio is a mechanical compression ratio when the combustion chamber volume is the maximum (the state shown in FIG. 3A).

In this way, in this example embodiment, the engine main body 1 is operated in a state in which the expansion ratio is higher than the actual compression ratio, while keeping the actual compression ratio at a value at which knocking will not occur, in the low load no-supercharging region and the medium load no-supercharging region, by cooperatively controlling the variable compression ratio mechanism I and the variable valve timing mechanism II.

Therefore, the percentage of the engine operating region occupied by the region where the intake air amount is controlled by the variable valve timing mechanism II while the throttle valve 26 is fully open without performing supercharging by the turbocharger 23, i.e., occupied by the medium load no-supercharging region, increases. As a result, there is an area where the medium load no-supercharging region is wide in the operating regions that are used with relatively high frequency (i.e., low-medium operation, low-medium load regions) encircled by the broken line in FIG. 8, so a state in which the throttle valve 26 is fully open and supercharging is not performed by the turbocharger 23 while the engine is operating may continue for an extended period of time. In such a case, problems such as those described below may occur.

That is, the air-fuel mixture and combustion gas (hereinafter, these will be referred to collectively as "blow-by gas") may leak into the crankcase 4 from inside the combustion chamber 10 while the engine is operating. When this blow-by gas accumulates inside the crankcase 4 and the pressure inside the crankcase 4 rises, it creates a large amount of resistance when the piston 7 moves from TDC to BDC, and as a result, the engine output decreases. Also, when blow-by gas accumulates in the crankcase 4, it causes oil in the oil pan 5 to deteriorate.

Therefore, the internal combustion engine of the type described above is provided with a blow-by gas returning apparatus that introduces blow-by gas inside the crankcase into the intake passage. This blow-by gas returning apparatus is configured to be able to introduce blow-by gas inside the crankcase into the intake passage downstream of the throttle valve using negative pressure generated in the intake passage downstream of the throttle valve, when supercharging is not being performed by a supercharger such as a turbocharger.

The blow-by gas returning apparatus is also configured to draw in the blow-by gas in the crankcase with an ejector provided in a passage that returns intake air from the downstream side of the supercharger to the upstream side of the supercharger, even if the throttle valve is fully open, and introduce the drawn in blow-by gas into the intake passage, using a pressure difference between the pressure on the downstream side of the supercharger (hereinafter also referred to as "downstream side pressure") and the pressure on the upstream side of the supercharger (hereinafter also referred to as "upstream side pressure") (downstream side pressure>upstream side pressure) when supercharging by the supercharger is being performed.

However, with the structure of this blow-by gas returning apparatus, the pressure inside the intake passage downstream of the throttle value will not be a negative pressure in an operating state in which the throttle valve is fully open and supercharging by the supercharger is not being performed. Therefore, the blow-by gas inside of the crankcase is unable to be introduced into the intake passage downstream of the throttle valve using negative pressure generated inside the intake passage downstream of the throttle valve.

Also, because supercharging by the supercharger is not being performed, the pressure on the upstream side of the supercharger and the pressure on the downstream side of the supercharger are substantially the same, or the pressure on the downstream side of the supercharger is conversely lower than the pressure on the upstream side of the supercharger due to pressure loss. Therefore, the intake air is unable to be returned from the downstream side of the supercharger to the upstream side of the supercharger, and the blow-by gas inside the crankcase is also unable to be drawn in by the ejector.

That is, with the structure of the blow-by gas returning apparatus described above, when in an operating state in which supercharging by the supercharger is not being performed and the throttle valve is fully open, the blow-by gas inside the crankcase is not able to be introduced into the intake passage, so the crankcase is unable to be ventilated. As a result, the engine output may decrease and the oil in the oil pan may deteriorate. In particular, in the internal combustion engine 100 according to this example embodiment, there are times when a state in which supercharging by the turbocharger 23 is not being performed and the throttle valve 26 is fully open while the engine is operating continues for an extended period of time, so this kind of decrease in engine output and deterioration of the oil may be significant.

Therefore, in this example embodiment, the blow-by gas returning apparatus is formed such that the crankcase 4 is able to be ventilated even in an operating state in which supercharging by the turbocharger 23 is not being performed and the throttle valve 26 is fully open.

Figure 9:
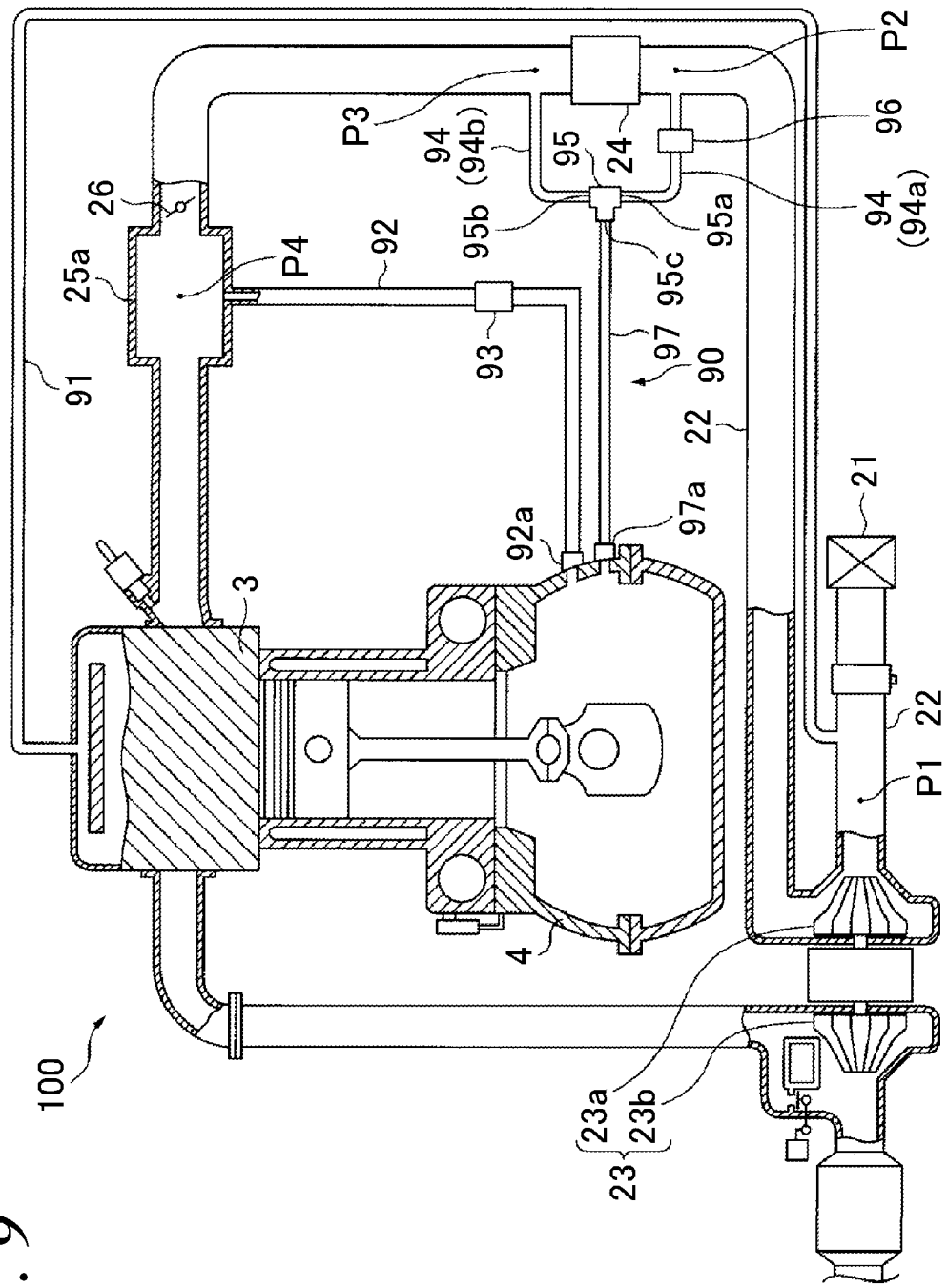
FIG. 9 is a block diagram schematically showing a blow-by gas returning apparatus according to the first example embodiment.

Hereinafter, the structure of a blow-by gas returning apparatus 90 according to the example embodiment, which is provided in internal combustion engine 100, will be described with reference to FIG. 9. FIG. 9 is a block diagram schematically showing the blow-by gas returning apparatus 90 according to this example embodiment. This blow-by gas returning apparatus 90 is not shown in FIG. 1.

As shown in FIG. 9, the blow-by gas returning apparatus 90 includes an air supply passage 91, a first blow-by gas passage 92, a PCV valve 93, a blow-by gas bypass passage 94, an ejector 95, a flowrate regulating valve 96, and a second blow-by gas passage 97.

The air supply passage 91 is a passage that communicates the intake passage upstream of the compressor 23a with the inside of the crankcase 4, and is used to introduce air (fresh air) that flows through the intake passage, into the crankcase 4. In this example embodiment, one end of the air supply passage 91 is connected to the intake pipe 22 upstream of the compressor 23a, and the other end of the air supply passage 91 is connected to the cylinder head 3. The other end of the air supply passage 91 is communicated with the inside of the crankcase 4 via an internal space in the cylinder head 3.

The first blow-by gas passage 92 is a passage that communicates the inside of the crankcase 4 with the intake passage downstream of the throttle valve 26, and is used to introduce blow-by gas inside of the crankcase 4 into the intake passage using negative pressure generated inside the intake passage downstream of the throttle valve 26. In this example embodiment, one end of the first blow-by gas passage 92 is connected to the crankcase 4 via an oil separator 92a, and the other end of the first blow-by gas passage 92 is connected to the surge tank 25a.

The PCV valve 93 is provided in the first blow-by gas passage 92. The PCV valve 93 is a pressure actuated valve the opening amount of which changes depending on the pressure difference between the pressure inside the crankcase 4 and the pressure inside the surge tank 25a. More specifically, the PCV valve 93 is configured such that the amount of blow-by gas that is able to pass through the PCV valve 93 (i.e., the blow-by gas flowrate through the PCV valve 93) becomes smaller when the negative pressure inside the surge tank 25a is large (when the throttle opening amount is small) compared to when the negative pressure inside the surge tank 25a is small. The PCV valve 93 is also configured to be fully closed when the pressure inside the crankcase 4 is equal to or less than the pressure inside the surge tank 25a.

The blow-by gas bypass passage 94 is a passage that communicates the intake passage between the compressor 23a and the intercooler 24 with the intake passage downstream of the intercooler 24. In this example embodiment, one end of the blow-by gas bypass passage 94 is connected to the intake pipe 22 between the compressor 23a and the intercooler 24, and the other end of the blow-by gas bypass passage 94 is connected to the intake pipe 22 between the intercooler 24 and the throttle valve 26.

The ejector 95 is provided in the blow-by gas bypass passage 94. The ejector 95 has a fluid inlet 95a, a fluid outlet 95b, and a fluid suction port 95c, and is configured such that, when fluid flows from a fluid inlet 95a toward a fluid outlet 95b, the ejector 95 is able to draw in another fluid from a fluid suction port 95c.

Figure 10:
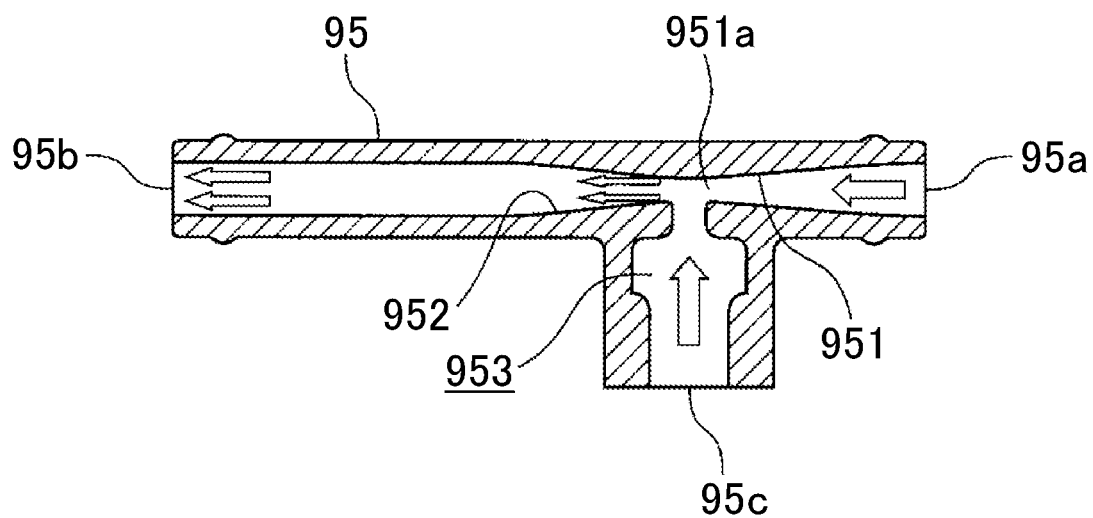
FIG. 10 is a sectional view of an ejector.

More specifically, as shown in the sectional view of the ejector 95 in FIG. 10, the ejector 95 includes therein a nozzle 951 formed on the fluid inlet 95a side, a diffuser 952 formed on the fluid outlet 95b side, and a pressure-reducing chamber 953 that is formed between the nozzle 951 and the diffuser 952 and is communicated with the fluid suction port 95c.

When fluid (air in this example embodiment) flows into the ejector 95 from the fluid inlet 95a, this fluid is throttled by the nozzle 951 and the flowrate increases, and the fluid is then ejected from a nozzle ejection hole 951a toward the diffuser 952. As a result, negative pressure is generated in the pressure-reducing chamber 953 by the venturi effect, and another fluid (blow-by gas in this example embodiment) is drawn in from the fluid suction port 95c by this negative pressure. The fluid ejected from the nozzle ejection hole 951a and the fluid drawn in from the fluid suction port 95c mix in the diffuser 952 and flow out from the fluid outlet 95b. The flowrate of the fluid drawn in from the fluid suction port 95c increases as the flowrate of the fluid that flows into the ejector 95 from the fluid inlet 95a increases.

Also, in this example embodiment, as shown in FIG. 9, the fluid inlet 95a of the ejector 95 is connected to one end side (on the upstream side of the intercooler 24) of the blow-by gas bypass passage 94, and the fluid outlet 95b is connected to the other end side (on the downstream side of the intercooler 24) of the blow-by gas bypass passage 94. Also, the other end of the second blow-by gas passage 97 is connected to the fluid suction port 95c. Therefore, in this example embodiment, when air flows through the blow-by gas bypass passage 94 from one end side to the other end side thereof, the blow-by gas inside the crankcase 4 is able to be drawn in through the second blow-by gas passage 97 by the ejector 95.

The flowrate regulating valve 96 is provided in the blow-by gas bypass passage 94. In this example embodiment, the flowrate regulating valve 96 is provided in a blow-by gas bypass passage 94a on the side connected to the fluid inlet 95a of the ejector 95, but the flowrate regulating valve 96 may also be provided in a blow-by gas bypass passage 94b on the side connected to the fluid outlet 95b of the ejector 95. The opening amount of the flowrate regulating valve 96 is adjusted by the electronic control unit 200, such that the flowrate regulating valve 96 changes the passage sectional area of the blow-by gas bypass passage 94 either continuously or in a stepped manner. The flowrate of air that flows into the blow-by gas bypass passage 94 from the intake pipe 22 on one end side of the blow-by gas bypass passage 94, i.e., the intake pipe 22 between the compressor 23a and the intercooler 24, (i.e., the flowrate of air that flows through the blow-by gas bypass passage 94) is controlled by adjusting the opening amount of the flowrate regulating valve 96 with the electronic control unit 200.

The second blow-by gas passage 97 is a passage that communicates the inside of the crankcase 4 with the pressure-reducing chamber 953 of the ejector 95. In this example embodiment, one end of the second blow-by gas passage 97 is connected to the crankcase 4 via an oil separator 97a, and the other end of the second blow-by gas passage 97 is connected to the fluid suction port 95c of the ejector 95.

Continuing on, operation of the blow-by gas returning apparatus 90 according to this example embodiment will be described with reference to FIG. 9.

First, the operation of the blow-by gas returning apparatus 90 when the engine operating point is in the low load no-supercharging region will be described. As shown in FIG. 9, when the pressure inside the intake passage upstream of the compressor 23a is denoted P1, the pressure inside the intake passage between the compressor 23a and the intercooler 24 is denoted P2, the pressure inside the intake passage between the intercooler 24 and the throttle valve 26 is denoted P3, and the pressure inside the intake passage downstream of the throttle valve 26 is denoted P4, the magnitude relation of the pressures inside the intake passage when the engine operating point is in the low load no-supercharging region is P1=P2>P3>>P4. The reason why P1=P2 when the engine operating point is in the low load no-supercharging region is because supercharging by the turbocharger 23 is not being performed, and P1 and P2 are both values corresponding to atmospheric pressure. The reason why P2>P3 is because of the pressure loss of the intercooler 24. The reason why P3>>P4 is because the throttle valve 26 is not fully open so the pressure inside the surge tank 25a (i.e., the pressure P4 inside of the intake passage downstream of the throttle valve 26) is a negative pressure.

In this way, when the engine operating point is in the low load no-supercharging region, the throttle valve 26 is not fully open, so the pressure inside the surge tank 25a (i.e., the pressure P4 inside of the intake passage downstream of the throttle valve 26) is a negative pressure. Therefore, the pressure inside the crankcase 4 is higher than the pressure inside the surge tank 25a, so the PCV valve 93 opens and the blow-by gas inside the crankcase 4 is drawn into the surge tank 25a through the first blow-by gas passage 92 by the negative pressure in the surge tank 25a.

Also, if the flowrate of the blow-by gas that is drawn into the surge tank 25a through the first blow-by gas passage 92 from inside the crankcase 4 becomes greater than the flowrate of blow-by gas that leaks into the crankcase 4 from the combustion chamber 10 such that there is a negative pressure inside the crankcase 4, for example, air (fresh air) is supplied into the crankcase 4 through the air supply passage 91. The air supplied into the crankcase 4 is drawn into the surge tank 25a through the first blow-by gas passage 92 together with the blow-by gas while ventilating the crankcase 4.

When the engine operating point is in the low load no-supercharging range in this way, there will be a negative pressure inside the surge tank 25a, so blow-by gas is introduced into the intake passage through the first blow-by gas passage 92 and the crankcase 4 is able to be ventilated. The control of the flowrate regulating valve 96 when the engine operating point is in the low load no-supercharging range will be described below together with the operation of the blow-by gas returning apparatus 90 when the engine operating point is in the medium load no-supercharging range.

Next, operation of the blow-by gas returning apparatus 90 when the engine operating point is in the medium load no-supercharging region will be described. When the engine operating point is in the medium load no-supercharging region, the magnitude relation between the pressures inside the intake passage described above is P1=P2>P3=P4. The reason why P1=P2 when the engine operating point is in the medium load no-supercharging region is because supercharging by the turbocharger 23 is not being performed, and P1 and P2 are both values corresponding to atmospheric pressure. The reason why P2>P3 is because of the pressure loss of the intercooler 24. The reason why P3=P4 is because the throttle valve 26 is fully open.

In this way, when the engine operating point is in the medium load no-supercharging region, supercharging by the turbocharger 23 is not being performed and the throttle valve 26 is fully open, so almost no negative pressure is generated in the surge tank 25a. Therefore, blow-by gas inside the crankcase 4 is unable to be drawn out to the surge tank 25a through the first blow-by gas passage 92.

Therefore, when the engine operating point is in the medium load no-supercharging region, the electronic control unit 200 opens the flowrate regulating valve 96 to a preset target opening amount. The target opening amount may be set appropriately from opening amounts other than fully closed. In this example embodiment, the target opening amount is fully open.

When comparing the pressure P2 in the intake passage between the compressor 23a and the intercooler 24 with the pressure P3 in the intake passage between the intercooler 24 and the throttle valve 26, the pressure P2 in the intake passage between the compressor 23a and the intercooler 24 will always be higher than the pressure P3 in the intake passage between the intercooler 24 and the throttle valve 26 because of the pressure loss of the intercooler 24, regardless of the throttle opening amount and whether there is a pressure boost (i.e., supercharging).

Therefore, there is always a pressure difference (pressure P2 in the intake passage on one end side>pressure P3 in the intake passage on the other end side) between both ends of the blow-by gas bypass passage 94, so air is able to flow from one end side toward the other end side of the blow-by gas bypass passage 94 by opening the flowrate regulating valve 96. As a result, blow-by gas in the crankcase 4 is drawn in by the ejector 95, and is introduced into the intake passage between the intercooler 24 and the throttle valve 26 via the blow-by gas bypass passage 94.

Also, if the flowrate of blow-by gas that is drawn into the blow-by gas bypass passage 94 from inside the crankcase 4 by the ejector 95 is larger than the flowrate of the blow-by gas that leaks into the crankcase 4 from the combustion chamber 10 such that there is negative pressure in the crankcase 4, for example, air (fresh air) is supplied into the crankcase 4 via the air supply passage 91. The air supplied into the crankcase 4 is drawn into the blow-by gas bypass passage 94 by the ejector 95 together with the blow-by gas while ventilating the crankcase 4.

In this way, when the engine operating point is in the medium load no-supercharging region, blow-by gas inside the crankcase 4 is able to be drawn into the blow-by gas bypass passage 94 by the ejector 95 by opening the flowrate regulating valve 96, so the crankcase 4 is able to be ventilated.

Here, when the engine operating point is in the low load no-supercharging region as well, there is a pressure difference (pressure P2 in the intake passage on one end side>pressure P3 in the intake passage on the other end side) between both ends of the blow-by gas bypass passage 94, just as when the engine operating point is in the medium load no-supercharging region. Therefore, if the flowrate regulating valve 96 is opened when the engine operating point is in the low load no-supercharging region, blow-by gas in the crankcase 4 will be drawn in from both the first blow-by gas passage 92 and the second blow-by gas passage 97, thereby enabling the crankcase 4 to be ventilated.

On the other hand, when the engine operating point is in the low load no-supercharging region, even if the flowrate regulating valve 96 is fully closed, blow-by gas in the crankcase 4 is drawn in from the first blow-by gas passage 92 and introduced into intake passage, thus enabling the crankcase 4 to be ventilated. Therefore, when the engine operating point is in the low load no-supercharging region, the flowrate regulating valve 96 may be open or it may be fully closed. In this example embodiment, when the engine operating point is in the low load no-supercharging region, the flowrate regulating valve 96 is fully open.

Lastly, operation of the blow-by gas returning apparatus 90 when the engine operating point is in the high load supercharging region will be described. When the engine operating point is in the high load supercharging region, the magnitude relation between the pressures inside the intake passage described above is P1<<P2 and P2>P3=P4. The reason why P1<<P2 when the engine operating point is in the high load supercharging region is because supercharging by the turbocharger 23 is being performed, and P1 is a value corresponding to atmospheric pressure and P2 is a pressure corresponding to the boost pressure. The reason why P2>P3 is because of the pressure loss of the intercooler 24. The reason why P3=P4 is because the throttle valve 26 is fully open.

When the engine operating point is in the high load supercharging region, i.e., when supercharging by the turbocharger 23 is being performed and the throttle valve 26 is fully open, there will not be negative pressure in the surge tank 25a. Therefore, blow-by gas in the crankcase 4 is unable to be drawn in to the surge tank 25a via the first blow-by gas passage 92.

On the other hand, when the engine operating point is in the high load supercharging region as well, there is a pressure difference (pressure P2 in the intake passage on one end side>pressure P3 in the intake passage on the other end side) between both ends of the blow-by gas bypass passage 94, just as when the engine operating point is in the medium load no-supercharging region. Therefore, if the flowrate regulating valve 96 is opened when the engine operating point is in the low load no-supercharging region, blow-by gas in the crankcase 4 will be drawn in from both the first blow-by gas passage 92 and the second blow-by gas passage 97, thereby enabling the crankcase 4 to be ventilated.

However, when supercharging by the turbocharger 23 is being performed, the temperature of the air discharged from the compressor 23a is high. Therefore, when more air than is necessary flows through the blow-by gas bypass passage 94, the percentage of high temperature air that is drawn into the cylinders 6 not via the intercooler 24, of the air that is drawn into the cylinders 6, is high. As a result, the charging efficiency decreases, and knocking may occur.

Therefore, when supercharging by the turbocharger 23 is being performed, it is desirable to control the flowrate of air that flows into the blow-by gas bypass passage 94 such that only the amount of blow-by gas that has leaked out of the combustion chamber 10 into the crankcase 4 is drawn in by the ejector 95.

Accordingly, when the engine operating point is in the high load supercharging region, the electronic control unit 200 controls the opening amount of the flowrate regulating valve 96 such that the flowrate of the blow-by gas drawn in by the ejector 95 comes to match a target flowrate according to the engine operating state.

Figure 11:
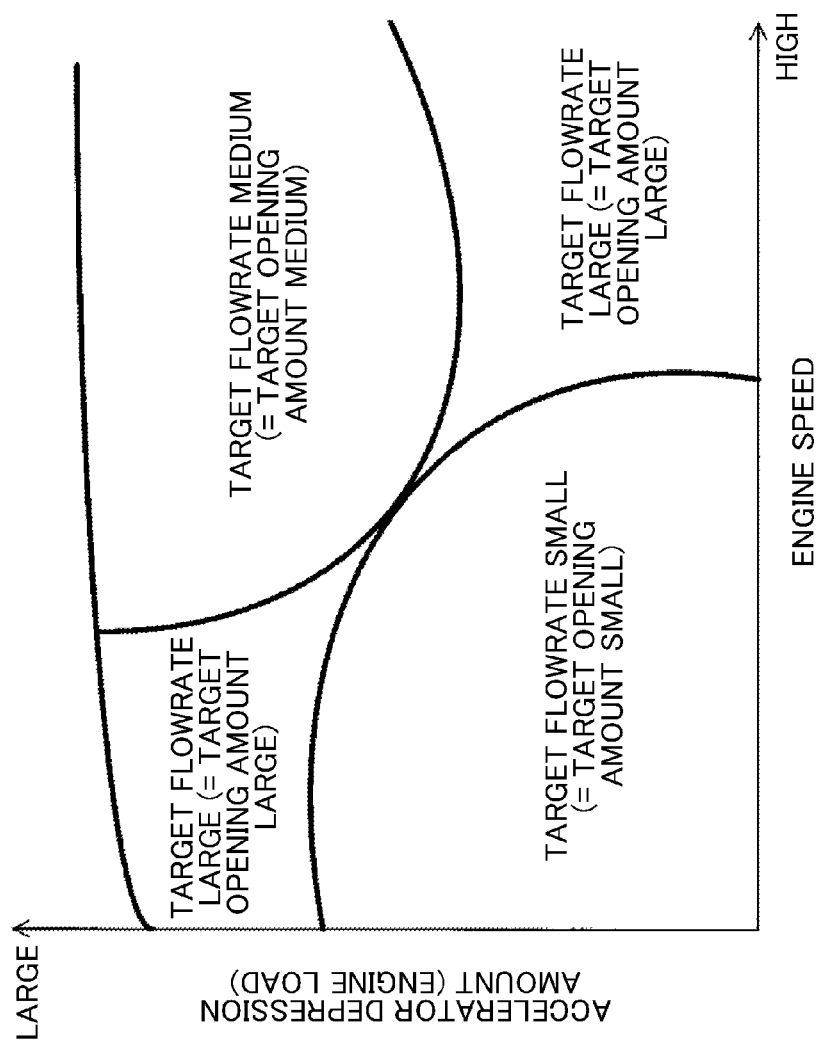
FIG. 11 is a map for calculating a target flowrate of blow-by gas to be drawn in by the ejector based on an engine operating state.

More specifically, the electronic control unit 200 calculates a target flowrate of the blow-by gas to be drawn in by the ejector 95 based on the engine operating state, referencing the map in FIG. 11. Then, the electronic control unit 200 sets a target opening amount of the flowrate regulating valve 96 based on the target flowrate, and controls the opening amount of the flowrate regulating valve 96 to match this target opening amount. The ejector 95 has a characteristic in which the flowrate of blow-by gas that is drawn in from the fluid suction port 95c increases as the flowrate of air that flows into the blow-by gas bypass passage 94 increases. Also, the pressure loss of the intercooler 24 is basically substantially constant regardless of the engine operating state (i.e., the boost pressure), and the pressure difference between both ends of the blow-by gas bypass passage 94 is also substantially constant, so in this example embodiment, the target opening amount is set to increase as the target flowrate increases. The target opening amount of the flowrate regulating valve 96 may also be set directly based on the engine operating state.

In this way, when the engine operating point is in the high load supercharging region, the charging efficiency is able to be inhibited from decreasing and knocking is able to be inhibited from occurring, while ventilating the crankcase 4 by using the ejector 95 to draw in the blow-by gas in the crankcase 4, by controlling the opening amount of the flowrate regulating valve 96 such that the flowrate comes to match the target flowrate according to the engine operating state.

The flowrate regulating valve 96 is basically provided to suppress knocking and a decrease in charging efficiency when the engine operating point is in the high load supercharging region, and thus does not absolutely need to be provided if knocking and a decrease in charging efficiency are acceptable. That is, the flowrate regulating valve 96 is not absolutely necessary to ventilate the crankcase 4 in each operating region if knocking and a decrease in charging efficiency are acceptable.

The internal combustion engine 100 according to the example embodiment described above includes the engine main body 1, the compressor (supercharger) 23a that is arranged in the intake passage of the engine main body 1, the intercooler 24 that is arranged in the intake passage downstream of the compressor 23a in the direction of intake air flow, and the blow-by gas returning apparatus 90 for introducing blow-by gas in the crankcase 4 of the engine main body 1 into the intake passage.

Also, the blow-by gas returning apparatus 90 includes the blow-by gas bypass passage (bypass passage) 94 that connects a first position of the intake passage to a second position of the intake passage, the ejector 95 that is arranged in the blow-by gas bypass passage 94 and draws in blow-by gas from the fluid suction port 95c when air flows through the blow-by gas bypass passage 94 from the first position toward the second position, and the second blow-by gas passage (blow-by gas passage) 97 that connects the crankcase 4 to the fluid suction port 95c of the ejector 95. The first position is between the compressor 23a and the intercooler 24, and the second position is downstream of the intercooler 24. More specifically, the second position is between the intercooler 24 and the throttle valve 26 that is arranged in the intake passage downstream of the intercooler 24 in the direction of intake air flow.

When comparing the pressure P2 in the intake passage between the compressor 23a and the intercooler 24 to the pressure P3 in the intake passage between the intercooler 24 and the throttle valve 26, the pressure in the intake passage between the compressor 23a and the intercooler 24 will be higher than the pressure in the intake passage between the intercooler 24 and the throttle valve 26 that is downstream of the intercooler 24 because of the pressure loss of the intercooler 24, regardless of the throttle opening amount and whether there is a pressure boost (i.e., supercharging). That is, a pressure difference (pressure P2 in the intake passage on the first position side>pressure P3 in the intake passage on the second position side) is created between both ends of the blow-by gas bypass passage 94 because of the pressure loss of the intercooler 24, regardless of the throttle opening amount and whether there is a pressure boost.

Therefore, by configuring the blow-by gas returning apparatus 90 as described above, even when the engine operating point is in the medium load no-supercharging region, i.e., even when the throttle valve 26 is fully open and supercharging by the turbocharger 23 is not being performed, air is able to be made to flow in the blow-by gas bypass passage 94 from the first position toward the second position of the intake passage by the pressure difference generated between both ends of the blow-by gas bypass passage 94. Therefore, the blow-by gas in the crankcase 4 is able to be drawn out by the ejector 95 provided in the blow-by gas bypass passage 94, thus enabling the crankcase 4 to be ventilated.

Moreover, even when the engine operating point is in the low load no-supercharging region and the high load supercharging region, air is able to be made to flow through the blow-by gas bypass passage 94 from the first position toward the second position of the intake passage by the pressure difference generated between both ends of the blow-by gas bypass passage 94. Therefore, by configuring the blow-by gas returning apparatus 90 as described above, even when the engine operating point is in the low load no-supercharging region and the high load supercharging region, the blow-by gas in the crankcase 4 is able to be drawn in by the ejector 95 provided in the blow-by gas bypass passage 94, so the crankcase 4 is able to be ventilated.

Furthermore, the blow-by gas returning apparatus 90 according to this example embodiment is also provided with the flowrate regulating valve 96 that is arranged in the blow-by gas bypass passage 94 and regulates the flowrate of air that flows into the blow-by gas bypass passage 94. The internal combustion engine 100 according to this example embodiment is also provided with the electronic control unit (controller) 200 that controls the opening amount of the flowrate regulating valve 96 based on the engine operating state.

The flowrate of the blow-by gas that the ejector 95 draws in from the crankcase 4 changes according to the flowrate of air that flows into the blow-by gas bypass passage 94. Therefore, by arranging the flowrate regulating valve 96 in the blow-by gas bypass passage 94 and controlling the opening amount of the flowrate regulating valve 96 based on the engine operating state, the flowrate of the blow-by gas drawn in by the ejector 95 is able to be freely regulated according to the engine operating state.

In particular, the electronic control unit 200 according to this example embodiment is configured such that, when the engine operating state is an operating state in which supercharging by the turbocharger 23 is being performed and the opening amount of the throttle valve 26 is fully open, the electronic control unit 200 controls the opening amount of the flowrate regulating valve 96 such that the flowrate of the blow-by gas drawn in by the ejector 95 comes to match a target flowrate according to the engine operating state. The ejector 95 has a characteristic in which the flowrate of blow-by gas that is drawn in from the fluid suction port 95c increases as the flowrate of air that flows into the blow-by gas bypass passage 94 increases. Therefore, the blow-by gas returning apparatus 90 according to this example embodiment is configured to increase the opening amount of the flowrate regulating valve 96 the larger the target flowrate is.

As a result, when supercharging by the turbocharger 23 is being performed and the temperature of the air discharged by the compressor 23a is high, it is possible to inhibit more air than is necessary from flowing into the blow-by gas bypass passage 94. Therefore, the amount of air drawn into the cylinders 6 not via the intercooler 24 is able to be kept to a minimum, so the charging efficiency is able to be inhibited from decreasing, and knocking is inhibited from occurring.

Also, the electronic control unit 200 is configured to open the flowrate regulating valve 96 when the engine operating state is an operating state in which supercharging by the turbocharger 23 is not being performed and the opening amount of the throttle valve 26 is fully open.

As a result, even if the flowrate regulating valve 96 is provided in the blow-by gas bypass passage 94, the crankcase 4 is able to be reliably ventilated by drawing in the blow-by gas in the crankcase 4 using the ejector 95 when the operating state is one in which supercharging by the turbocharger 23 is not being performed and the opening amount of the throttle valve 26 is fully open.

Next, a blow-by gas returning apparatus 90 according to a second example embodiment will be described with reference to FIG. 12. Hereinafter, mainly the difference from the blow-by gas returning apparatus 90 according to the first example embodiment will be described.

Figure 12:
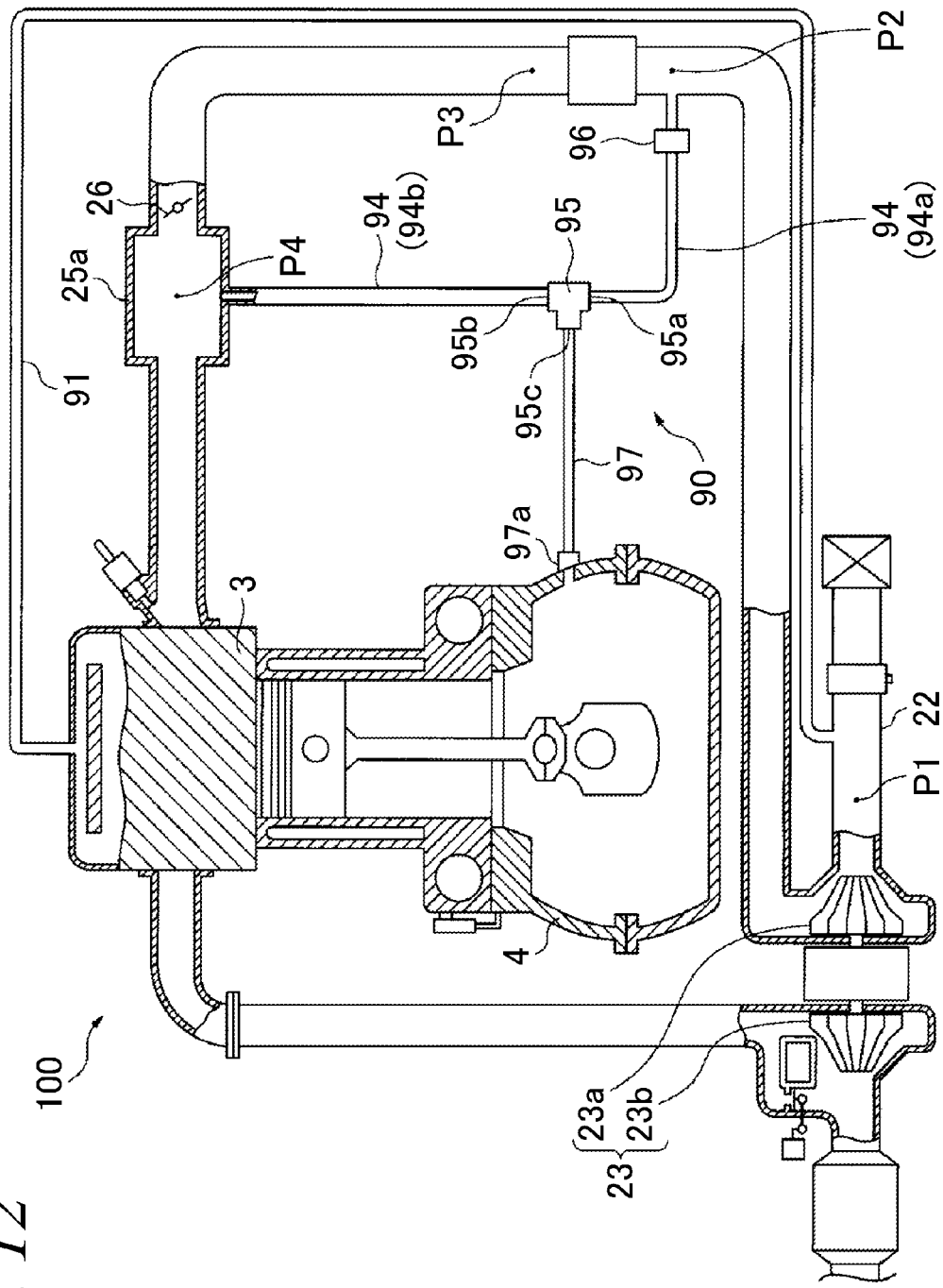
FIG. 12 is a block diagram schematically showing a blow-by gas returning apparatus according to a second example embodiment.

FIG. 12 is a block diagram schematically showing the blow-by gas returning apparatus 90 according to the second example embodiment provided in the internal combustion engine 100.

As shown in FIG. 12, the blow-by gas returning apparatus 90 according to this example embodiment differs from the blow-by gas returning apparatus 90 according to the first example embodiment in that the first blow-by gas passage 92 is omitted, and the other end of the blow-by gas bypass passage 94 is connected to the surge tank 25a. Other than these differences the structure of the blow-by gas returning apparatus 90 according to this example embodiment is the same as the structure of the blow-by gas returning apparatus 90 according to the first example embodiment.

Continuing on, the operation of the blow-by gas returning apparatus 90 according to this example embodiment will be described with reference to FIG. 12.

First, the operation of the blow-by gas returning apparatus 90 according to this example embodiment when the engine operating point is in the low load no-supercharging region will be described. In this example embodiment as well, the magnitude relation of the pressures in the intake passage when the engine operating point is in the low load no-supercharging region is P1=P2>P3>>P4, similar to the first example embodiment.

When the engine operating point is in the low load no-supercharging region, i.e., when the throttle valve 26 is not fully open, the pressure in the surge tank 25a (i.e., pressure P4 in the intake passage downstream of the throttle valve 26) will be a negative pressure. Therefore, when the engine operating point is in the low load no-supercharging region, blow-by gas in the crankcase 4 is drawn into the surge tank 25a via the second blow-by gas passage 97, the ejector 95, and the blow-by gas bypass passage 94b by the negative pressure in the surge tank 25a, regardless of the opening amount of the flowrate regulating valve 96, thus enabling the crankcase 4 to be ventilated.

That is, the second blow-by gas passage 97, the ejector 95, and the blow-by gas bypass passage 94b are able to function similar to the first blow-by gas passage 92 of the blow-by gas returning apparatus 90 according to the first example embodiment, by connecting the other end of the blow-by gas bypass passage 94 to the surge tank 25a. Therefore, there is no need to provide the first blow-by gas passage 92 as in the blow-by gas returning apparatus 90 according to the first example embodiment, so the structure of the blow-by gas returning apparatus 90 is able to be simplified and costs are able to be reduced.

Next, the operation of the blow-by gas returning apparatus 90 when the engine operating point is in the medium load no-supercharging region will be described.

In this example embodiment as well, the magnitude relation between the pressures in the intake passage described above when the engine operating point is in the medium load no-supercharging region is P1=P2>P3=P4, similar to the first example embodiment. As is evident from this relationship, the pressure P3 in the intake passage between the intercooler 24 and the throttle valve 26 to which the other end of the second blow-by gas passage 97 is connected in the first example embodiment matches the pressure P4 in the intake passage (the surge tank 25a) downstream of the throttle valve 26 to which the other end of the second blow-by gas passage 97 is connected in this example embodiment.

Therefore, in this example embodiment as well, when the engine operating point is in the medium load no-supercharging region, a pressure difference (pressure P2 in the intake passage on one end side>pressure P4 in the intake passage on the other end side) similar to in the first example embodiment is created between both ends of the blow-by gas bypass passage 94. Therefore, in this example embodiment as well, when the engine operating point is in the medium load no-supercharging region, the flowrate regulating valve 96 is opened to a preset target opening amount similar to in the first example embodiment. As a result, operation and effects similar to those of the first example embodiment are able to be obtained.

Lastly, the operation of the blow-by gas returning apparatus 90 when the engine operating point is in the high load supercharging region will be described.

In this example embodiment as well, the magnitude relation between the pressures in the intake passage described above when the engine operating point is in the high load supercharging region is P1<<P2 and P2>P3=P4, similar to the first example embodiment. As is evident from this relationship, the pressure P3 in the intake passage between the intercooler 24 and the throttle valve 26 to which the other end of the second blow-by gas passage 97 is connected in the first example embodiment matches the pressure P4 in the intake passage (the surge tank 25a) downstream of the throttle valve 26 to which the other end of the second blow-by gas passage 97 is connected in this example embodiment.

Therefore, in this example embodiment as well, when the engine operating point is in the high load supercharging region, a pressure difference (pressure P2 in the intake passage on one end side>pressure P4 in the intake passage on the other end side) similar to that in the first example embodiment is created between both ends of the blow-by gas bypass passage 94. Therefore, in this example embodiment as well, when the engine operating point is in the high load supercharging region, the opening amount of the flowrate regulating valve 96 is controlled to match a target flowrate according to the engine operating state, similar to in the first example embodiment. As a result, operation and effects similar to those of the first example embodiment are able to be obtained.

The blow-by gas returning apparatus 90 according to the example embodiment described above includes the blow-by gas bypass passage 94 that connects the first position to the second position of the intake passage, the ejector 95 that is arranged in the blow-by gas bypass passage 94 and draws in blow-by gas from the fluid suction port 95c when air flows through the blow-by gas bypass passage 94 from the first position toward the second position, and the second blow-by gas passage 97 that connects the crankcase 4 to the fluid suction port 95c of the ejector 95. The first position is between the compressor 23a and the intercooler 24, and the second position is downstream of the intercooler 24. More specifically, the second position is downstream of the throttle valve 26 that is arranged in the intake passage on the downstream side of the intercooler 24 in the direction of intake air flow.

Accordingly, when the operating state is one in which the throttle valve 26 is not fully open, the crankcase 4 is able to be ventilated by drawing in blow-by gas in the crankcase 4 via the second blow-by gas passage 97, the ejector 95, and the blow-by gas bypass passage 94, by the negative pressure generated in the intake passage downstream of the throttle valve 26. Therefore, there is no need to provide the first blow-by gas passage 92 as in the blow-by gas returning apparatus 90 according to the first example embodiment, so the structure of the blow-by gas returning apparatus 90 is able to be simplified and costs are able to be reduced. Effects other than these are the same as the effects obtained by the blow-by gas returning apparatus 90 according to the first example embodiment.

While example embodiments have been described above, these example embodiments merely illustrate some examples of application. The technical scope is in no way limited to the specific structures of these example embodiments.

The blow-by gas returning apparatus 90 according to each of the example embodiments described above includes the variable compression ratio mechanism I and the variable valve timing mechanism II, and is suitable for the internal combustion engine 100 in which the medium load no-supercharging region is particularly wide. However, as described above, the crankcase 4 is also able to be ventilated by drawing the blow-by gas in the crankcase 4 into the intake passage in all of the operating regions, i.e., the low load no-supercharging region, the medium load no-supercharging region, and the high load supercharging region. Therefore, the blow-by gas returning apparatus 90 may also be applied to an internal combustion engine having no (or a narrow) medium load no-supercharging region. Accordingly, the blow-by gas returning apparatus 90 may also be applied to an internal combustion engine that is not provided with either the variable compression ratio mechanism I or the variable valve timing mechanism II, and may also be applied to an internal combustion engine with just one of these two mechanisms.

What is claimed is:

1. An internal combustion engine comprising:
   an engine main body;
   a supercharger that is arranged in an intake passage of the engine main body;
   an intercooler that is arranged downstream of the supercharger in a direction of intake air flow, in the intake passage; and
   a blow-by gas returning apparatus configured to introduce blow-by gas in a crankcase of the engine main body into the intake passage,
   the blow-by gas returning apparatus including a bypass passage, an ejector, and a blow-by gas passage,
   the bypass passage connecting a first position and a second position of the intake passage together,
   the ejector being arranged in the bypass passage,
   the ejector including a fluid suction port,
   the ejector being configured to draw in blow-by gas from the fluid suction port when air flows through the bypass passage from the first position toward the second position,
   the blow-by gas passage being configured to connect the crankcase and the fluid suction port together,
   the first position being between the supercharger and the intercooler, and
   the second position being downstream of the intercooler.

2. The internal combustion engine according to claim 1, further comprising a throttle valve, wherein
   the throttle valve is arranged downstream of the intercooler in the direction of intake air flow, in the intake passage; and
   the second position is downstream of the throttle valve.

3. An engine system comprising:
   an internal combustion engine including
   an engine main body,
   a supercharger that is arranged in an intake passage of the engine main body,
   an intercooler that is arranged downstream of the supercharger in a direction of intake air flow, in the intake passage, and
   a blow-by gas returning apparatus configured to introduce blow-by gas in a crankcase of the engine main body into the intake passage,
   the blow-by gas returning apparatus including a bypass passage, an ejector, and a blow-by gas passage, and a flowrate regulating valve,
   the bypass passage connecting a first position and a second position of the intake passage together,
   the ejector being arranged in the bypass passage,
   the ejector including a fluid suction port,
   the ejector being configured to draw in blow-by gas from the fluid suction port when air flows through the bypass passage from the first position toward the second position,
   the blow-by gas passage being configured to connect the crankcase and the fluid suction port together,
   the flowrate regulating valve being arranged in the bypass passage,
   the flowrate regulating valve being configured to regulate a flowrate of air that flows into the bypass passage,
   the first position being between the supercharger and the intercooler, and
   the second position being downstream of the intercooler; and
   an electronic control unit configured to control an opening amount of the flowrate regulating valve based on an operating state of the internal combustion engine.

4. The engine system according to claim 3, characterized in that
   the internal combustion engine further includes a throttle valve,
   the electronic control unit is configured to control the opening amount of the flowrate regulating valve such that a flowrate of blow-by gas that is drawn in by the ejector comes to match a target flowrate according to the operating state of the internal combustion engine, when the internal combustion engine is in a first operating state; and
   the first operating state includes a condition that supercharging by the supercharger is being performed, and a condition that an opening amount of the throttle valve is fully open.

5. The engine system according to claim 4, characterized in that
   the flowrate of blow-by gas that the ejector draws in from the fluid suction port increases as the flowrate of air that flows into the bypass passage increases; and
   the electronic control unit is configured to increase the opening amount of the flowrate regulating valve the larger the target flowrate is.

6. The engine system according to claim 3, characterized in that
   the internal combustion engine further includes a throttle valve,
   the electronic control unit is configured to open the flowrate regulating valve when the internal combustion engine is in a second operating state; and
   the second operating state includes a condition that supercharging by the supercharger is not being performed, and a condition that an opening amount of the throttle valve is fully open.

7. The engine system according to claim 4, characterized in that
   the electronic control unit is configured to open the flowrate regulating valve when the internal combustion engine is in a second operating state; and
   the second operating state includes a condition that supercharging by the supercharger is not being performed, and the condition that the opening amount of the throttle valve is fully open.

8. The engine system according to claim 5, characterized in that
   the electronic control unit is configured to open the flowrate regulating valve when the internal combustion engine is in a second operating state; and
   the second operating state includes a condition that supercharging by the supercharger is not being performed, and the condition that the opening amount of the throttle valve is fully open.

* * * * *